United States Patent
Nakagawa et al.

(10) Patent No.: US 9,447,575 B2
(45) Date of Patent: Sep. 20, 2016

(54) POLYAMIDE RESIN COMPOSITION, EXPANDED POLYAMIDE RESIN MOLDING, AND AUTOMOTIVE RESIN MOLDING

(75) Inventors: Tomohide Nakagawa, Otsu (JP); Tadamine Ohashi, Iwakuni (JP); Yasuto Fujii, Nagoya (JP); Akio Tange, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 262 days.

(21) Appl. No.: 13/880,169

(22) PCT Filed: Nov. 1, 2011

(86) PCT No.: PCT/JP2011/075224
§ 371 (c)(1),
(2), (4) Date: Apr. 18, 2013

(87) PCT Pub. No.: WO2012/060392
PCT Pub. Date: May 10, 2012

(65) Prior Publication Data
US 2013/0209784 A1 Aug. 15, 2013

(30) Foreign Application Priority Data

Nov. 1, 2010 (JP) ................................ 2010-245687
Nov. 1, 2010 (JP) ................................ 2010-245688

(51) Int. Cl.
*B29C 44/00* (2006.01)
*E04B 1/78* (2006.01)
*C08L 77/00* (2006.01)
*C08J 9/06* (2006.01)
*F02F 7/00* (2006.01)

(52) U.S. Cl.
CPC ............. *E04B 1/78* (2013.01); *B29C 67/2205* (2013.01); *C08J 9/06* (2013.01); *C08L 77/00* (2013.01); *C08J 2377/00* (2013.01); *C08L 2205/02* (2013.01); *F02F 7/0085* (2013.01); *Y10T 428/249977* (2015.04)

(58) Field of Classification Search
CPC .............. B29C 67/2205; C08L 77/00; C08L 2205/02; E04B 1/78; F02F 7/0085; Y10T 428/249977; C08J 9/06; C08J 2377/00
See application file for complete search history.

(56) References Cited

U.S. PATENT DOCUMENTS

| 3,702,280 A * | 11/1972 | Anderson .................. 428/318.8 |
| 5,997,781 A | 12/1999 | Nishikawa et al. |
| 2009/0029143 A1 | 1/2009 | Kanae et al. |

FOREIGN PATENT DOCUMENTS

| GB | 1156217 | * 6/1969 |
| JP | 2003-220655 | 8/2003 |
| JP | 2005-126545 | 5/2005 |
| JP | 2006-35687 | 2/2006 |
| JP | 2006-69215 | 3/2006 |
| JP | 2006-212945 | 8/2006 |
| JP | 2009-114366 | 5/2009 |
| JP | 2009-132908 | 6/2009 |
| JP | 2009-249549 | 10/2009 |
| JP | 2009-299056 | 12/2009 |
| JP | 2010-150509 | 7/2010 |
| WO | 2006/080491 | 8/2006 |

OTHER PUBLICATIONS

Chinese Office Action issued May 19, 2014, in corresponding Chinese Application No. 201180052650.5, with English translation.
International Search Report issued Feb. 7, 2012 in International (PCT) Application No. PCT/JP2011/075224.
Extended European Search Report issued Apr. 7, 2014 in European Application No. 11 83 8042.

* cited by examiner

*Primary Examiner* — Irina S Zemel
(74) *Attorney, Agent, or Firm* — Wenderoth, Lind & Ponack, L.L.P.

(57) ABSTRACT

Provided is a polyamide resin composition which can provide an expanded molding being superior in heat resistance and sufficiently reduced in weight and having high load resistance by a simple molding process. The polyamide resin composition is characterized by comprising a polyamide resin (A), a glycidyl-group-containing styrene copolymer (B) having two or more glycidyl groups per molecule, a weight average molecular weight of 4000 to 25000 and an epoxy value of 400 to 2500 Eq/$1\times10^6$ g and an inorganic reinforcing material (C) in a proportion such that the content of the glycidyl-group-containing styrene copolymer (B) is 0.2 to 25 parts by mass and the content of the inorganic reinforcing material (C) is 0 to 350 parts by mass relative to 100 parts by mass of the polyamide resin (A).

15 Claims, 7 Drawing Sheets

(A)

2 mm (B)

300 μm 2 mm (A)

1 mm (B)

200 μm 1 mm

POLYAMIDE RESIN COMPOSITION, EXPANDED POLYAMIDE RESIN MOLDING, AND AUTOMOTIVE RESIN MOLDING

TECHNICAL FIELD

The present invention relates to an expanded polyamide resin molding being reduced in weight and high in load resistance without impairing the heat resistance of a polyamide resin. Specifically, the present invention relates to a polyamide resin composition capable of affording such an expanded molding by a simple molding method, an expanded polyamide resin molding that is the aforesaid expanded molding and is useful for an automotive resin molding or the like further being high in heat insulating properties and oscillation resistance, and an automotive resin molding using the expanded polyamide resin molding.

BACKGROUND ART

Commonly known methods for producing an expanded polyamide resin molding include a method using a chemical foaming agent (a chemical foaming method). The chemical foaming method is a method that comprises mixing a raw material resin and an organic foaming agent that decomposes on heating to generate gas and then heating the mixture to temperature equal to or higher than the decomposition temperature of the foaming agent. For example, in Patent Document 1, a polyamide terpolymer is used and an expanded polyamide molding having a specific gravity of 1.2 has been obtained by using a chemical foaming agent. However, this expanded polyamide molding is low in expansion ratio and therefore has failed to satisfy weight reduction sufficiently.

As a method for producing an expanded polyamide resin molding other than methods using a chemical foaming agent, Patent Document 2 has proposed a method that comprises making a polyamide molding absorb carbon dioxide beforehand, then heating it in a post step, thereby obtaining an expanded polyamide molding having an expansion ratio of 2. However, it cannot be said that the expanded polyamide molding produced by this method has not been reduced in weight sufficiently and the method has a disadvantage that it is complicated and low in productivity because the molding step and the expanding step are substantially separate steps.

Moreover, Patent Document 3 has disclosed a method for producing an expanded polyamide molding by dissolving a supercritical fluid of nitrogen or carbon dioxide in a molten resin, followed by injection molding. However, this method achieves an expansion ratio as low as 1.25 and therefore has failed to realize sufficient weight reduction.

On the other hand, Patent Document 4 has disclosed a method for obtaining an expanded molding with a fine average cell diameter using a polystyrene resin, but the method has a disadvantage of lacking versatility because not only a common injection molding machine but also a specially designed injection plunger and a specially designed injection apparatus are needed in order to obtain an expanded molding of interest. Moreover, the expanded molding reported in this document is only one prepared using a polystyrene resin, which can be expansion-molded relatively easily in an existing expansion molding method, and even if this method is applied to a polyamide resin, which is difficult to be expansion-molded, a desired expanded molding is not readily available.

Moreover, Patent Document 5 has proposed a method in which when a molten resin filled into a mold has reached a certain viscoelastic state during a cooling process, a core-side mold is moved in the mold opening direction and simultaneously a critical inert gas is injected directly into the resin in the mold, so that an expanded molding is obtained. However, it has been difficult to form uniform foam cells by this method because a crystalline polyamide high in solidification rate can maintain a proper viscoelastic state in a short period of time.

As described above, a polyamide is a resin superior in heat resistance and mechanical characteristics and has been expected to be used in the form of various resin moldings such as automotive components and household electrical appliance components. However, since the melt viscosity characteristics of a polyamide are not suited for expansion molding, it has been difficult to obtain, by a simple molding method, an expanded polyamide resin molding having a uniform expanded layer with an expansion ratio high enough for attaining sufficient lightweightness.

Incidentally, in recent automobile design aiming at reduction in fuel consumption, a reduction in weight by replacing a metal component with a resin molding component is a significant challenge. However, automotive components such as an engine cover, a cylinder head cover, and a transmission cover, are required to have high heat insulating properties and high oscillation resistance as well as lightweightness, and there are not so many resin moldings that satisfy such requirements. Structures for attaining weight reduction and heat insulating properties include expanded structure bodies. However, polypropylene, polystyrene, polyethylene, and the like, which are low in heat resistance, cannot satisfy load resistance required as moldings because those materials themselves are degraded or softened rather than heat insulating properties under the environment of use of 100° C. or higher. Thus, expanded moldings of a polyamide resin with superior heat resistance have been expected to be used as alternative resin molding components for automotive components. In use as automotive components, however, heat insulating properties and oscillation resistance are required in addition to lightweightness which is usually possessed by expanded moldings as described above.

PRIOR ART DOCUMENTS

Patent Documents

Patent Document 1: JP-A-2009-249549
Patent Document 2: JP-A-2006-35687
Patent Document 3: JP-A-2005-126545
Patent Document 4: JP-A-2006-69215
Patent Document 5: JP-A-2006-212945

SUMMARY OF THE INVENTION

Problems to be Solved by the Invention

The present invention has been devised in light of the above-described situations, and an objective thereof is to provide an expanded polyamide resin molding being superior in heat resistance and sufficiently reduced in weight and having high load resistance, a polyamide resin composition capable of affording such an expanded molding by a simple molding method, an expanded polyamide resin molding useful for an automotive resin molding and the like further being high in heat insulating properties and oscillation resistance, and an automotive resin molding using the same.

Solutions to the Problems

The present inventors have studied earnestly in order to attain the objective described above and, as a result, found that if the solidification rate of a polyamide resin is controlled and the effect of relaxing deformation in a linear-nonlinear region at the time of melting is increased, an expanded molding being superior in heat resistance and sufficiently reduced in weight and having high load resistance can be obtained.

In addition, it has been found that it is beneficial as a first means capable of increasing the relaxation effect to use a polyamide resin composition containing a specific glycidyl group-containing styrene copolymer along with a polyamide resin in a prescribed ratio as a raw material for injection molding, and it has been confirmed that an expanded molding being superior in heat resistance and sufficiently reduced in weight and having high load resistance is thereby obtained easily. Moreover, it has been also found that the application of a process that includes enlarging a mold just after injection molding in producing an expanded molding can further increase the lightweightness and the load resistance.

Moreover, it has been found that it is beneficial as a second means capable of increasing the relaxation effect to use a crystalline polyamide resin and a noncrystalline polyamide resin in combination as polyamide resins and adopt a process that includes injecting and filling a chemical foaming agent and/or a supercritical inert gas together with a resin in a molten state into a cavity formed by two or more molds closed, and then enlarging the cavity at a prescribed stage, and it has been confirmed that it is possible to produce thereby easily an expanded molding useful as an automotive resin molding and the like, the molding having a uniform expanded structure which has never been attained conventionally, being superior in heat resistance and sufficiently reduced in weight and having high load resistance, and being capable of developing high heat insulating properties and high oscillation resistance.

The present invention has been completed based on these findings.

That is, the present invention includes the following configurations.

(1) A polyamide resin composition comprising:
a polyamide resin (A);
a glycidyl group-containing styrene copolymer (B) having two or more glycidyl groups per molecule, a weight average molecular weight of 4000 to 25000, and an epoxy value of 400 to 2500 Eq/1×10$^6$ g; and
an inorganic reinforcing material (C) in a proportion such that the content of the glycidyl group-containing styrene copolymer (B) is 0.2 to 25 parts by mass and the content of the inorganic reinforcing material (C) is 0 to 350 parts by mass relative to 100 parts by mass of the polyamide resin (A).

(2) The polyamide resin composition according to the above (1), wherein the polyamide resin (A) comprises a crystalline polyamide resin (a) and a noncrystalline polyamide resin (b), the proportion of which is (a):(b)=0 to 100:100 to 0 (mass ratio).

(3) The polyamide resin composition according to the above (1) or (2), wherein the glycidyl group-containing styrene copolymer (B) is a copolymer including 20 to 99% by mass of a vinyl aromatic monomer (X), 1 to 80% by mass of a glycidylalkyl (meth)acrylate (Y), and 0 to 79% by mass of a vinyl group-containing monomer (Z) containing no epoxy group other than the (X).

(4) The polyamide resin composition according to any one of the above (1) to (3), a matrix composition composed of the polyamide resin (A) and the glycidyl group-containing styrene copolymer (B) has an $\alpha$ of smaller than 1.4 and an absolute value of $(\alpha-\beta)$ of 0.5 or less, where a multiplier ($y=ax^\alpha$; a is a constant) taken when a storage modulus (unit: Pa) obtained by melt viscoelasticity measurement within a frequency range of 10 to 100 rad/s in a linear region is plotted on a log-log graph of a frequency (x) and a storage modulus (y) is represented by a, and a multiplier ($y'=bx'^\beta$; b is a constant) taken when a loss modulus (unit: Pa) obtained by melt viscoelasticity measurement within a frequency range of 10 to 100 rad/s in a linear region is plotted on a log-log graph of a frequency (x') and a loss modulus (y') is represented by $\beta$.

(5) An expanded polyamide resin molding obtained by using the polyamide resin composition according to any one of the above (1) to (4).

(6) The expanded polyamide resin molding according to the above (5) obtained by injecting and filling the polyamide resin composition in a molten state together with a chemical foaming agent and/or a supercritical inert gas into a cavity formed by two or more molds closed, and then enlarging the capacity of the cavity by moving at least one of the molds in the mold opening direction at a stage where an unexpanded skin layer being 100 to 800 μm in thickness is formed in a surface layer.

(7) An expanded polyamide resin molding obtained by bringing a polyamide resin composition into a molten state, injecting and filling the polyamide resin composition together with a chemical foaming agent and/or a supercritical inert gas into a cavity formed by two or more molds closed, and then enlarging the capacity of the cavity by moving at least one of the molds in the mold opening direction at a stage where an unexpanded skin layer being 100 to 800 μm in thickness is formed in a surface layer, wherein the polyamide resin composition comprises:
a crystalline polyamide resin (a);
a noncrystalline polyamide resin (b);
a glycidyl group-containing styrene copolymer (B) having two or more glycidyl groups per molecule, a weight average molecular weight of 4000 to 25000, and an epoxy value of 400 to 2500 Eq/1×10$^6$ g; and
an inorganic reinforcing material (C) in a proportion such that the content of the glycidyl group-containing styrene copolymer (B) is 0 to 30 parts by mass and the content of the inorganic reinforcing material (C) is 0 to 350 parts by mass relative to 100 parts by mass of the crystalline polyamide resin (a) and the noncrystalline polyamide resin (b) in total.

(8) The expanded polyamide resin molding according to the above (7), wherein the proportion of the crystalline polyamide resin (a) and the noncrystalline polyamide resin (b) is the crystalline polyamide-resin (a): the noncrystalline polyamide resin (b)=95:5 to 50:50 (mass ratio).

(9) The expanded polyamide resin molding according to the above (7) or (8), wherein the glycidyl group-containing styrene copolymer (B) is a copolymer including 20 to 99% by mass of a vinyl aromatic monomer (X), 1 to 80% by mass of a glycidylalkyl (meth)acrylate (Y), and 0 to 79% by mass of a vinyl group-containing monomer (Z) containing no epoxy group other than the (X).

(10) The expanded polyamide resin molding according to any one of the above (7) to (9), wherein the resonant frequency, x (Hz), of the expanded polyamide resin molding is 1.5 times or more the resonant frequency, y (Hz), of an unexpanded molding obtained by bringing the polyamide resin composition into a molten state, injecting the polyamide resin composition into a cavity formed by two or more molds closed without pouring any chemical foaming agent and/or any supercritical inert gas, and molding the polyamide resin composition without moving any mold in the mold opening direction.

(11) The expanded polyamide resin molding according to any one of the above (5) to (10), wherein an expanded layer composed of a continuous resin phase and closed foam cells having an average cell diameter of 10 to 300 µm and an unexpanded skin layer stacked on the expanded layer and having a thickness of 100 to 800 µm are formed of the polyamide resin composition, and the expanded polyamide resin molding has a specific gravity of 0.2 to 1.0.

(12) The expanded polyamide resin molding according to the above (11), having a sandwich structure in which the unexpanded layers are provided on both sides of the expanded layer.

(13) An automotive resin molding having a heat insulating property, which is formed of the expanded polyamide resin molding according to any one of the above (7) to (12).

(14) The automotive resin molding having a heat insulating property according to the above (13), which is a thermally resistant cover selected from the group consisting of an engine cover, a cylinder head cover, and a transmission cover.

Effects of the Invention

According to the present invention, it is possible to provide an expanded polyamide resin molding being superior in heat resistance and sufficiently reduced in weight and having high load resistance, a polyamide resin composition capable of affording such an expanded molding by a simple molding method, an expanded polyamide resin molding further being high in heat insulating properties and oscillation resistance, and an automotive resin molding using the same. An expanded polyamide resin molding according to the present invention is an expanded molding that has an expanded structure being uniform and high in expansion ratio and that is superior in both lightweightness and load resistance, and therefore it can be used suitably as a functional resin component with high requirements or a design component required to have functionalities in the application fields such as automotive components and household electrical appliance components. In particular, the expanded polyamide resin molding of the present invention being high heat insulating properties and high oscillation resistance is useful as an automotive resin molding.

MODE FOR CARRYING OUT THE INVENTION

Figure 1:
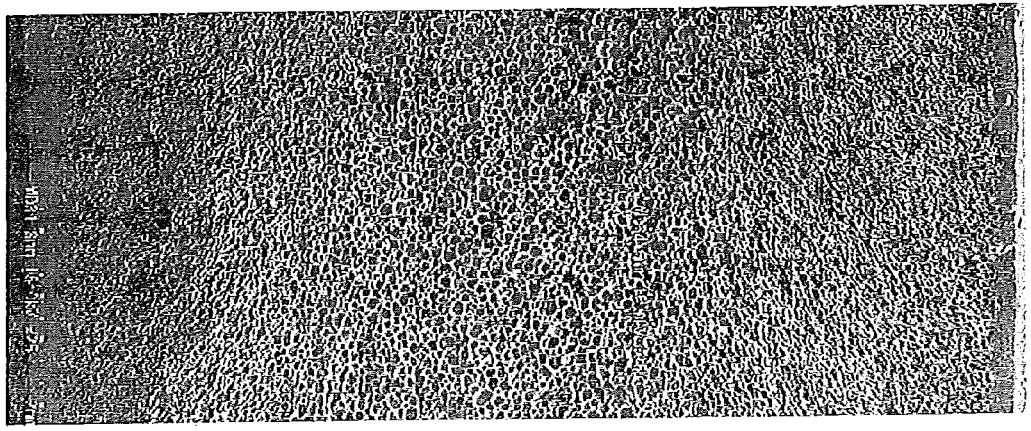
FIG. 1 is a photograph of a cross-section of an expanded polyamide resin molding that is one embodiment of the present invention (Example 1-27).
Figure 1:
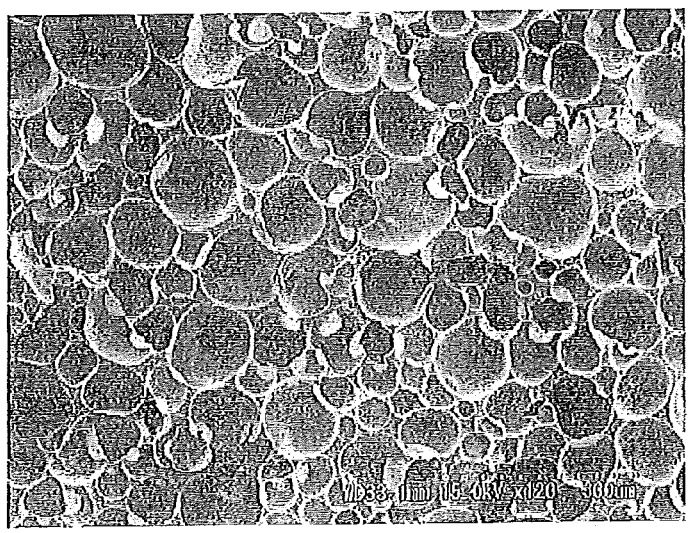

A first expanded polyamide resin molding of the present invention has a feature of being obtained by using a polyamide resin composition comprising a polyamide resin (A), a glycidyl group-containing styrene copolymer (B) having two or more glycidyl groups per molecule, a weight average molecular weight of 4000 to 25000, and an epoxy value of 400 to 2500 Eq/1×10$^6$ g, and an inorganic reinforcing material (C) in a proportion such that the content of the glycidyl group-containing styrene copolymer (B) is 0.2 to 25 parts by mass and the content of the inorganic reinforcing material (C) is 0 to 350 parts by mass relative to 100 parts by mass of the polyamide resin (A) (namely, a first polyamide resin composition).

A second expanded polyamide resin molding of the present invention is an expanded molding obtained by bringing a polyamide resin composition into a molten state, injecting and filling the polyamide resin composition together with a chemical foaming agent and/or a supercritical inert gas into a cavity formed by two or more molds closed, and then enlarging the capacity of the cavity by moving at least one of the molds in the mold opening direction at a stage where an unexpanded skin layer being 100 to 800 µm in thickness is formed in a surface layer, wherein the polyamide resin composition comprises a crystalline polyamide resin (a), a noncrystalline polyamide resin (b), a glycidyl group-containing styrene copolymer (B) having two or more glycidyl groups per molecule, a weight average molecular weight of 4000 to 25000, and an epoxy value of 400 to 2500 Eq/1×10$^6$ g, and an inorganic reinforcing material (C) in a proportion such that the content of the glycidyl group-containing styrene copolymer (B) is 0 to 30 parts by mass and the content of the inorganic reinforcing material (C) is 0 to 350 parts by mass relative to 100 parts by mass of the crystalline polyamide resin (a) and the noncrystalline polyamide resin (b) in total.

First, the polyamide resin composition that constitutes the first and second expanded polyamide resin moldings of the present invention will be described in detail below. In the present description, the polyamide resin composition that constitutes the above-mentioned first expanded polyamide resin molding is referred to as a "first polyamide resin composition" and the polyamide resin composition that constitutes the above-mentioned second expanded polyamide resin molding is referred to as a "second polyamide resin composition."

(Polyamide Resin Composition)

The first polyamide resin composition comprises a polyamide resin (A) and a specific glycidyl group-containing styrene copolymer (B) and, as necessary, comprises an inorganic reinforcing material (C). On the other hand, the second polyamide resin composition comprises a crystalline polyamide resin (a) and a noncrystalline polyamide resin (b) and, as necessary, comprises a specific glycidyl group-containing styrene copolymer (B) and an inorganic reinforcing material (C). Here, the polyamide resin (A) is composed of a crystalline polyamide resin (a) and/or a noncrystalline polyamide resin (b). In the following, "crystalline polyamide resin (a) and/or noncrystalline polyamide resin (b)" may together be referred to as "polyamide resin (A)."

[Polyamide Resin (A) (Crystalline Polyamide Resin (a) and/or Noncrystalline Polyamide Resin (b))]

The polyamide resin (A) to be used in the present invention is a resin prepared by using a lactam, an oraminocarboxylic acid, a dicarboxylic acid, a diamine, etc. as raw materials and is a polyamide resin resulting from the polycondensation of such an amine ingredient and an acid ingredient, or a copolymer or blend thereof.

Specifically, examples of the amine ingredient to constitute the polyamide resin (A) include aliphatic diamines such as 1,2-ethylenediamine, 1,3-trimethylenediamine, 1,4-tetramethylenediamine, 1,5-pentamethylenediamine, 2-methyl-1,5-pentamethylenediamine, 1,6-hexamethylenediamine, 1,7-heptamethylenediamine, 1,8-octamethylenediamine, 1,9-nonamethylenediamine, 2-methyl-1,8-octamethylenediamine, 1,10-decamethylenediamine, 1,11-undecamethylenediamine, 1,12-dodecamethylenediamine, 1,13-tridecamethylenediamine, 1,16-hexadecamethylenediamine, 1,18-octadecamethylenediamine, and 2,2,4 (or 2,4,4)-trimethylhexamethylenediamine; alicyclic diamines such as piperazine, cyclohexanediamine, bis(3-methyl-4-aminohexyl)methane, bis-(4,4'-aminocyclohexyl)methane, and isophoronediamine; aromatic diamines, such as metaxylylenediamine, paraxylylenediamine, paraphenylenediamine, and metaphenylenediamine, and hydrogenated products thereof; and the like.

Examples of the acid ingredient to constitute the polyamide resin (A) include polyvalent carboxylic acids and acid anhydrides. Examples of the polyvalent carboxylic acids include aromatic dicarboxylic acids such as terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, 4,4'-diphenylether dicarboxylic acid, 5-sodium sulfonate-isophthalic acid, and 5-hydroxyisophthalic acid; aliphatic or alicyclic dicarboxylic acids such as fumaric acid, maleic acid, succinic acid, itaconic acid, adipic acid, azelaic acid, sebacic acid, 1,11-undecanedioic acid, 1,12-dodecanedioic acid, 1,14-tetradecanedioic acid, 1,18-octadecanedioic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, and dimer acid; and the like.

Examples of the ingredient to constitute the polyamide resin (A) include lactams such as ε-caprolactam, aminocarboxylic acids having structures resulting from the ring opening of such lactams; undecanelactam and lauryllactam, and 11-aminoundecanoic acid and 12-aminododecanoic acid, which have structures resulting from the ring opening of undecanelactam and lauryllactam, respectively, and the like. Examples of the polyamide resin (A) to be polymerized from such ingredients include polyamides such as polycaproamide (Nylon 6), polyundecamide (Nylon 11), polylauramide (Nylon 12), poly(tetraethylene adipamide) (Nylon 46), poly(hexamethylene adipamide) (Nylon 66), poly(undecamethylene adipamide) (Nylon 116), poly(metaxylylene adipamide) (Nylon MXD6), poly(paraxylylene adipamide) (Nylon PXD6), poly(tetramethylene sebacamide) (Nylon 410), poly(hexamethylene sebacamide) (Nylon 610), poly(decamethylene adipamide) (Nylon 106), poly(decamethylene sebacamide) (Nylon 1010), poly(hexamethylene dodecamide) (Nylon 612), poly(decamethylene dodecamide) (Nylon 1012), poly(hexamethylene isophthalamide) (Nylon 6I), poly(tetramethylene terephthalamide) (Nylon 4T), poly(pentamethylene terephthalamide) (Nylon 5T), poly(2-methylpentamethylene terephthalamide) (Nylon M-5T), poly(hexamethylene terephthalamide) (Nylon 6T), poly(hexamethylene hexahydroterephthalamide) (Nylon 6T(H)), poly(nonamethylene terephthalamide) (Nylon 9T), poly(undecamethylene terephthalamide) (Nylon 11T), poly(dodecamethylene terephthalamide) (Nylon 12T), poly[bis(3-methyl-4-aminohexyl)methane terephthalamide] (Nylon PACMT), poly[bis(3-methyl-4-aminohexyl)methane isophthalamide] (Nylon PACM•I), poly[bis(3-methyl-4-aminohexyl)methane dodecamide] (Nylon PACM12), and poly[bis(3-methyl-4-aminohexyl)methane tetradecamide] (Nylon PACM14), copolymers of such polyamides (e.g., poly(hexamethylene terephthalamide/hexamethylene isophthalamide) (Nylon 6T6I)), and/or blend compositions thereof.

It is preferable to use a crystalline polyamide resin (a) and a noncrystalline polyamide resin (b) in combination as the polyamide resin (A); this combination is necessary for, especially, the second polyamide resin composition. Blending a crystalline polyamide resin (a), which is crystallized rapidly, with a noncrystalline polyamide resin (b), which has an effect of reducing the crystallization rate of the crystalline polyamide resin (a), allows crystallization rate to be controlled.

In the present invention, the term "crystalline polyamide resin (a)" shall mean, for example, a resin that exhibits a clear endothermic peak temperature in melting point measurement using a differential scanning calorimeter as described in the following Examples, whereas the term "noncrystalline polyamide resin (b)" shall mean a resin that does not exhibit any clear endothermic peak temperature in the melting point measurement.

Examples of the crystalline polyamide resin (a) include, but are not limited to, crystalline aliphatic polyamides such as Nylon 6, Nylon 66, Nylon 46, and Nylon 11. Polyamide resins highly compatible with the crystalline polyamide resin (a) are preferable as the noncrystalline polyamide resin (b) and preferable examples thereof include Nylon 6T6I, Nylon PACM14, Nylon PACM12, and Nylon PACM12•I. Higher compatibility of the crystalline polyamide resin (a) with the noncrystalline polyamide resin (b) allows an effect of increasing the apparent extensional melt viscosity to be obtained in a cooling process during which foam cells grow and, accordingly, better appearance and better foam structure can be obtained. From this point of view, a particularly preferable combination of the crystalline polyamide resin (a) and the noncrystalline polyamide resin (b) may be a combination in which the crystalline polyamide resin (a) is Nylon 6 and the noncrystalline polyamide resin (b) is Nylon 6T6I; and the like.

The effect of lowering the crystallization rate by combining the crystalline polyamide resin (a) and the noncrystalline polyamide resin (b) can be evaluated with the crystallization temperature (Tc2) at the time of the DSC temperature dropping of a blend of the crystalline polyamide resin (a) and the noncrystalline polyamide resin (b); it is preferable that the Tc2 of the blend (polyamide resin (A)) is 200° C. or lower and particularly preferably 190° C. or lower.

When the polyamide resin (A) is a blend composition of the crystalline polyamide resin (a) and the noncrystalline polyamide resin (b), the DSC melting point (Tm) of at least one crystalline polyamide resin (a) of all the crystalline polyamide resins (a) blended is preferably 150° C. or higher and 350° C. or lower in terms of heat resistance. If the melting point (Tm) is lower than 150° C., the heat resistance tends to be insufficient, whereas if the melting point exceeds 350° C., a decomposition highly probably proceeds during a molding process and it becomes difficult to achieve good moldability and obtain a stable expanded molding. Examples of a resin that exhibits such a melting point (Tm) include polycaproamide (Nylon 6), polyundecamide (Nylon 11), polylauramide (Nylon 12), poly(hexamethylene adipamide) (Nylon 66), and poly(tetramethylene adipamide) (Nylon 46).

In the case where the major ingredient of the polyamide resin (A) (accounting for 80% by mass of more of the polyamide resin (A)) is the noncrystalline polyamide resin (b), the glass transition temperature (Tg) of the noncrystalline polyamide resin (b) is preferably 120° C. or higher and 200° C. or lower. If the glass transition temperature is lower than 120° C., the heat resistance may become insufficient, whereas if the glass transition point exceeds 200° C., it may become difficult to apply the expansion method involving enlargement of a mold described below because solidification temperature becomes excessively high.

Regarding the proportions of the crystalline polyamide resin (a) and the noncrystalline polyamide resin (b) in the case where the polyamide resin (A) is a blend composition thereof, in the first polyamide resin composition, it is preferable that crystalline polyamide resin (a): noncrystalline polyamide resin (b) (mass ratio)=0 to 100:100 to 0, preferably 97:3 to 50:50, more preferably 95:5 to 50:50. On the other hand, in the second polyamide resin composition, it is preferable that crystalline polyamide resin (a) noncrystalline polyamide resin (b) (mass ratio)=95:5 to 50:50, more preferably 95:5 to 60:40, and even more preferably 95:5 to 70:30. If the proportions of the two resins are within the above-mentioned range, the effect of lowering the crystallization rate can be exhibited more efficiently.

The relative viscosity (R) of the polyamide resin (A) (the crystalline polyamide resin (a) and/or the noncrystalline polyamide resin (b)) measured at 20° C. in 96% concentrated sulfuric acid is preferably 0.4 to 4.0, more preferably 1.0 to 3.5, and even more preferably 1.5 to 3.0. A method for allowing the relative viscosity of a polyamide to fall within a certain range includes a means of adjusting the molecular weight thereof. Every relative viscosity (RV) disclosed in the present description is one measured at 20° C. in 96% concentrated sulfuric acid.

The amount of end groups or the molecular weight of the polyamide resin (A) (the crystalline polyamide resin (a) and/or the noncrystalline polyamide resin (b)) can be adjusted by a method of performing polycondensation while adjusting the molar ratio of amino groups and carboxyl groups or a method comprising adding an end-capping agent.

When polycondensation is performed while the molar ratio of amino groups and carboxyl groups is adjusted to a certain ratio, it is preferable to adjust the molar ratio of all diamines and all dicarboxylic acids to be used to within the range of diamines/dicarboxylic acids=1.00/1.05 to 1.10/1.00.

When the ends of the polyamide resin (A) (the crystalline polyamide resin (a) and/or the noncrystalline polyamide resin (b)) are capped, the time of the addition of the end-capping agent includes at the time of feeding raw materials, at the start of polymerization, in the late stage of polymerization, or at the end of polymerization. While the end-capping agent is not particularly restricted as long as it is a monofunctional compound having reactivity with an amino group or a carboxyl group at an end of a polyamide, monocarboxylic acids, monoamines, acid anhydrides (e.g., phthalic anhydride), monoisocyanates, monoacid halides, monoesters, monoalcohols, and the like may be used. Specific examples of the end-capping agent include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalene carboxylic acid, and phenylacetic acid; acid anhydrides such as maleic anhydride, phthalic anhydride, and hexahydrophthalic anhydride; aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and the like.

The acid value and amine value of the polyamide resin (A) (the crystalline polyamide resin (a) and/or the noncrystalline polyamide resin (b)) are each preferably 0 to 200 Eq/$1\times10^6$ g, more preferably 0 to 100 Eq/$1\times10^6$ g. If the amount of end functional groups exceeds 200 Eq/$1\times10^6$ g, gelation or degradation is likely to occur during melt residence, and problems such as color formation and hydrolysis may be caused under the environment of use. In particular, when glass fiber or a reactive compound such as a maleic acid-modified polyolefin is compounded, it is preferable to adjust the acid value and/or the amine value to 5 to 100 Eq/$1\times10^6$ g depending on the reactivity and reactive groups.

While the molecular weight of the polyamide resin (A) (the crystalline polyamide resin (a) and/or the noncrystalline polyamide resin (b)) is not particularly limited, the first polyamide resin composition preferably has a number average molecular weight of 3000 to 40000. On the other hand, in the case of the second polyamide resin composition, the number average molecular weight is preferably 10000 to 50000, more preferably 12000 to 40000, and even more preferably 13000 to 30000. If the number average molecular weight is smaller than the range described above, there is a tendency that mechanical strength decreases, whereas if it is larger than the range described above, the moldability may deteriorate. The number average molecular weight can be measured by the method disclosed in Examples described below.

[Glycidyl Group-Containing Styrene Copolymer (B)]

The glycidyl group-containing styrene copolymer (B) to be used in the present invention may be, for example, one obtained by polymerizing a monomer mixture comprising a vinyl aromatic monomer (X), a glycidylalkyl (meth)acrylate (Y), and, as necessary, a vinyl group-containing monomer (Z) having no epoxy groups other than the (X) (henceforth referred to as "other vinyl group-containing monomer"). If the glycidyl group-containing styrene copolymer (B) is included, the molecular weight will increase and the effect of increasing extensional melt viscosity can be obtained and therefore the processing condition administration width can be extended and, as a result, an expanded molding superior in lightweightness and load resistance as well as in heat resistance can be obtained. Specifically, relatively loose crosslinking which does not result in gelation, or a branched structure is formed via a reaction of the polyamide resin (A) (the crystalline polyamide resin (a) and/or the noncrystalline polyamide resin (b)) with the glycidyl group-containing styrene copolymer (B), and the reaction product will contribute to enhancement of an effect of molecular entanglement in a molten state. Moreover, this reaction product increases melt viscosity, and also it is surmised that when strain is added in a molten state, the reaction product exhibits an effect of delaying relaxation behavior as a long-term relaxation ingredient in a wide shear rate region. Therefore, the first polyamide resin composition comprises the glycidyl group-containing styrene copolymer (B) as an essential ingredient. In the case where the crystalline polyamide resin (a) is blended with the noncrystalline polyamide resin (b), when both the resins are highly compatible, a sufficient effect of increasing extensional melt viscosity may be obtained without the inclusion of the glycidyl group-containing styrene copolymer (B). Therefore, the second polyamide resin composition fails to comprise the glycidyl group-containing styrene copolymer (B) as an essential ingredient.

Examples of the vinyl aromatic monomer (X) include styrene, α-methylstyrene and the like. Examples of the glycidyl alkyl (meth)acrylate (Y) include glycidyl (meth)acrylate, (meth)acrylates having a cyclohexene oxide structure, (meth)acrylic glycidyl ethers and the like; of these, glycidyl (meth)acrylate is preferable in terms of high reactivity. Examples of the other vinyl group-containing monomer (Z) include alkyl (meth)acrylates having an alkyl group with 1 to 22 carbon atoms (the alkyl group may be either a linear chain or a branched chain) such as methyl (meth)acrylate, ethyl (meth)acrylate, propyl (meth)acrylate, butyl (meth)acrylate, 2-ethylhexyl (meth)acrylate, cyclohexyl (meth)acrylate, stearyl (meth)acrylate, and methoxyethyl (meth)acrylate, a polyalkylene glycol(meth)acrylate, an alkoxyalkyl (meth)acrylate, a hydroxyalkyl (meth)acrylate, a dialkylaminoalkyl (meth)acrylate, a benzyl (meth)acrylate, a phenoxyalkyl (meth)acrylate, an isobornyl (meth)acrylate, and an alkoxysilylalkyl (meth)acrylate. Vinyl esters such as (meth)acrylamide, (meth)acryldialkylamide, and vinyl acetate, vinyl ethers, aromatic vinyl monomers such as (meth)allyl ethers, α-olefin monomers such as ethylene and propylene, and the like can be also used as the other vinyl group-containing monomer (Z).

Preferably, the glycidyl group-containing styrene copolymer (B) is a copolymer composed of 20 to 99% by mass of the vinyl aromatic monomer (X), 1 to 80% by mass of the glycidylalkyl (meth)acrylate (Y), and 0 to 79% by mass of the other vinyl group-containing monomer (Z), more preferably a copolymer composed of 20 to 99% by mass of the (X), 1 to 80% by mass of the (Y) and 0 to 40% by mass of the (Z), and even more preferably a copolymer composed of 25 to 90% by mass of the (X), 10 to 75% by mass of the (Y) and 0 to 35% by mass of the (Z). Preferably, each of the composition is controlled appropriately to the range described above because the composition has an influence on the functional-group concentration that contributes to the reaction with the polyamide resin (A).

Specific examples of the glycidyl group-containing styrene copolymer (B) include styrene/methyl methacrylate/glycidyl methacrylate copolymers, and epoxy compounds of bisphenol A-type, cresol novolak-type, or phenol novolak-type. Either one kind or two or more kinds in admixture may be used as the glycidyl group-containing styrene copolymer (B).

The glycidyl group-containing styrene copolymer (B) preferably has two or more glycidyl groups per one molecule as functional groups capable of reacting with the amino group or the carboxyl group that is possessed by the polyamide resin (A) (the crystalline polyamide resin (a) and the noncrystalline polyamide resin (b)), and the inclusion of such glycidyl groups is needed particularly in the first polyamide resin composition. This allows crosslinking to be promptly introduced partly into the whole resin and causes an amino group or a carboxyl group possessed by the polyamide resin (A) to react with the glycidyl group-containing styrene copolymer (B) during melt extrusion, so that the polyamide resin and the glycidyl group-containing styrene copolymer are converted partly into a crosslinked product and thereby an effect of improving extensional melt viscosity can be obtained. The glycidyl groups in the glycidyl group-containing styrene copolymer (B) may be present at, for example, any of the main chain, side chains, or ends of the polymer.

In order to control the glycidyl group-containing styrene copolymer (B) so as to enable extensional melt viscosity adjustment, the (B) preferably has a weight average molecular weight of 4000 to 25000, and particularly in the first polyamide resin composition, the weight average molecular weight needs to be within this range. The weight average molecular weight is preferably 5000 to 15000, and more preferably 6000 to 10000. It the weight average molecular weight of the glycidyl group-containing styrene copolymer (B) is less than 4000, there is a tendency that an unreacted glycidyl group-containing styrene copolymer (B) evaporates during the molding step or bleeds out of the surface of a molding, causing deterioration of the adhesiveness of a product or pollution of the surface. Moreover, there is also a possibility that burnt wastes are formed due to an excess reaction of the glycidyl group-containing styrene copolymers (B), leading to a decrease in productivity at the time of kneading or deterioration of the quality of final products. On the other hand, if the weight average molecular weight of the glycidyl group-containing styrene copolymer (B) exceeds 25,000, the effect of maintaining the molecular weight may be reduced due to the delay of reaction at the time of kneading extrusion or the durability, such as heat resistance, possessed inherently by the polyamide resin (A) may be reduced due to the deterioration of the compatibility of the glycidyl group-containing styrene copolymer (B) with the polyamide resin (A).

The epoxy value of the glycidyl group-containing styrene copolymer (B) is preferably 400 to 2500 $Eq/1\times10^6$ g, and particularly in the first polyamide resin composition, it is necessary that the epoxy value of the glycidyl group-containing styrene copolymer (B) be within this range. The epoxy value is preferably 500 to 1500 $Eq/1\times10^6$ g, and more preferably 600 to 1000 $Eq/1\times10^6$ g. If the epoxy value is less than 400 $Eq/1\times10^6$ g, there is a possibility that a targeted effect of controlling rheology will not be exhibited, whereas if it exceeds 2500 $Eq/1\times10^6$ g, there is a possibility that the thickening effect will be exhibited excessively and the moldability will be adversely influenced.

In the case of the first polyamide resin composition, the content of the glycidyl group-containing styrene copolymer (B) is 0.2 to 25 parts by mass, preferably 0.2 to 15 parts by mass, and more preferably 0.3 to 12 parts by mass, relative to 100 parts by mass of the polyamide resin (A). On the other hand, in the case of the second polyamide resin composition, the content of the glycidyl group-containing styrene copolymer (B) is 0 to 30 parts by mass, preferably 0.1 to 15 parts by mass, and more preferably 0.2 to 12 parts by mass, relative to 100 parts by mass of the crystalline polyamide resin (a) and the noncrystalline polyamide resin (b) in total. If the content of the glycidyl group-containing styrene copolymer (B) is less than the range described above, it may become difficult to exhibit a targeted effect of controlling rheology, whereas if it is more than the range described above, there is a tendency that the thickening effect is exhibited excessively and the moldability is adversely influenced or the mechanical characteristics of the molding are adversely influenced.

[Inorganic Reinforcing Material (C)]

The inorganic reinforcing material (C) to be used in the present invention is a material that improves physical properties such as strength, rigidity, and heat resistance most effectively, and specific examples thereof include fibrous materials such as glass fiber, carbon fiber, aramid fiber, alumina fiber, silicon carbide fiber, and zirconia fiber, whiskers of aluminum borate, potassium titanate, and the like, needle-like wollastonite, milled fibers and the like. Besides, fillers such as glass beads, glass flakes, glass balloons, silica, talc, kaolin, wollastonite, mica, alumina, hydrotalcite, montmorillonite, graphite, carbon nanotubes, fullerene, zinc oxide, indium oxide, tin oxide, iron oxide, titanium oxide, magnesium oxide, aluminum hydroxide, magnesium hydroxide, red phosphorus, calcium carbonate, potassium titanate, lead zirconate titanate, barium titanate, aluminum nitride, boron nitride, zinc borate, aluminum borate, barium sulfate, magnesium sulfate, and layered silicate organically treated for the purpose of interlayer exfoliation can be also used as the inorganic reinforcing material (C). Of these, particularly, glass fiber, carbon fiber, and the like are preferably used. Such an inorganic reinforcing material (C) may be either only a single material or a combination of two or more materials.

For example, the glass fiber that can be used suitably is one in the form of chopped strand cut into a fiber length of about 1 to 20 mm. Regarding the cross-sectional shape of the glass fiber, a glass fiber having a circular cross-section or a noncircular cross-section can be used. Glass fibers having a noncircular cross-section include those being approximately elliptical, approximately oval, and approximately cocoon-like in a cross section perpendicular to the longitudinal direction of the fiber length, and in this case the flatness is preferably 1.5 to 8. The flatness as used herein is a ratio of major axis/minor axis where assuming a rectangle with a minimum area circumscribed with a cross section of a glass fiber perpendicular to the longitudinal direction of the glass fiber, the length of the longer sides of the rectangle is defined as a major axis and the length of the shorter sides is defined as a minor axis. Although the thickness the glass fiber is not particularly limited, the minor axis diameter is about 1 to about 20 µm and the major axis diameter is about 2 to about 100 µm.

The inorganic reinforcing material (C) is preferably one treated beforehand with a coupling agent such as an organic silane compound, an organic titanium compound, an organic borane compound, or an epoxy compound in order to improve the affinity with the polyamide resin (A) (the crystalline polyamide resin (a) and/or the noncrystalline polyamide resin (b)), and particularly preferably one that easily reacts with a carboxylic acid group and/or a carboxylic anhydride group. Although any of a silane coupling agent, a titanate coupling agent, an aluminate coupling agent, and the like may be used as the coupling agent, and of these, silane coupling agents such as an aminosilane coupling agent and an epoxysilane coupling agent are particularly preferred. For example, a polyamide resin composition in which a glass fiber treated with a coupling agent is incorporated is preferred because it can afford a molding superior in mechanical characteristics and appearance characteristics. Although it is preferred to perform the treatment with a coupling agent beforehand, it can be also used with post-addition of a coupling agent.

The content of the inorganic reinforcing material (C) is 0 to 350 parts by mass relative to 100 parts by mass of the polyamide resin (A) (the total of the crystalline polyamide resin (a) and the noncrystalline polyamide resin (b)). The content is preferably 0 to 150 parts by mass, and more preferably 0 to 120 parts by mass. If the inorganic reinforcing material (C) exceeds 350 parts by mass, the elongation of the molten resin at the time of expansion is reduced, so that adjoining cells will be easily combined and become coarser.

Regarding the inclusion proportions of the polyamide resin (A), the glycidyl group-containing styrene copolymer (B), and the inorganic reinforcing material (C) in the first polyamide resin composition, it is preferred that the polyamide resin (A) accounts for 30 to 99% by mass, the glycidyl group-containing styrene copolymer (B) accounts for 0.2 to 10% by mass, and the inorganic reinforcing material (C) accounts for 0 to 65% by mass relative to 100% by mass of the polyamide resin (A), the glycidyl group-containing styrene copolymer (B), and the inorganic reinforcing material (C) in total. More preferably, the polyamide resin (A) accounts for 40 to 95% by mass, the glycidyl group-containing styrene copolymer (B) accounts for 0.5 to 10% by mass, and the inorganic reinforcing material (C) accounts for 0 to 55% by mass. Even more preferably, the polyamide resin (A) accounts for 50 to 90% by mass, the glycidyl group-containing styrene copolymer (B) accounts for 1.2 to 10% by mass, and the inorganic reinforcing material (C) accounts for 0 to 45% by mass, and particularly preferably the polyamide resin (A) accounts for 60% by mass or more. On the other hand, regarding the inclusion proportions of the crystalline polyamide resin (a), the noncrystalline polyamide resin (b), the glycidyl group-containing styrene copolymer (B), and the inorganic reinforcing material (C) in the second polyamide resin composition, it is preferred that the total of the crystalline polyamide resin (a) and the noncrystalline polyamide resin (b) accounts for 30 to 100% by mass, the glycidyl group-containing styrene copolymer (B) accounts for 0 to 10% by mass, and the inorganic reinforcing material (C) accounts for 0 to 70% by mass relative to 100% by mass of the crystalline polyamide resin (a), the noncrystalline polyamide resin (b), the glycidyl group-containing styrene copolymer (B), and the inorganic reinforcing material (C)) in total. The inclusion of the above-described ingredients respectively in the proportions described above makes it easier to effectively exhibit a targeted effect of rheology control and obtain an expanded molding superior in light-weightness and load resistance as well as in heat resistance.

[Additives]

In the first or second polyamide resin composition may be included various kinds of additives that have heretofore been used for polyamide resins other than the ingredients described above. Examples of the additives include a stabilizer, an impact improver, a flame retardant, a release agent, a sliding improver, a coloring agent, a plasticizer, a nucleating agent and the like. A hydrotalcite compound may be also used as an additive for the purpose of preventing metal corrosion of mold and the like. Either a single additive or two or more additives may be used.

Examples of the stabilizer include hindered phenolic antioxidants, sulfur-type antioxidants, phosphorus-type antioxidants, organic antioxidants and heat stabilizers such as phosphite compounds and thioether compounds, light stabilizers and UV absorbers of hindered amine-type, benzophenone-type, imidazole-type, and the like, metal deactivators, and the like. A copper compound (specifically, copper salt of organic carboxylic acid such as cuprous chloride, cuprous bromide, cuprous iodide, cupric chloride, cupric bromide, cupric iodide, cupric phosphate, cupric pyrophosphate, copper sulfide, copper nitrate, or copper acetate) is useful as one of the heat stabilizers because it can prevent effective long-term thermal aging under a high temperature environment of 120° C. or higher. Moreover, it is preferable to use this cupper compound in combination with an alkali metal halide compound. Examples of the alkali metal halide compound include lithium chloride, lithium bromide, lithium iodide, sodium fluoride, sodium chloride, sodium bromide, sodium iodide, potassium fluoride, potassium chloride, potassium bromide, potassium iodide and the like. In the case of including the stabilizer, the content thereof is preferably 0 to 5 parts by mass, more preferably 0 to 3 parts by mass, and even more preferably 0 to 1 part by mass relative to 100 parts by mass of the polyamide resin (A) (the total of the crystalline polyamide resin (a) and the noncrystalline polyamide resin (b)). In particular, in the case where the stabilizer is the copper compound, the content thereof is preferably 0.005 to 0.5 parts by mass, and more preferably 0.01 to 0.5 parts by mass relative to 100 parts by mass of the crystalline polyamide resin (a) and the noncrystalline polyamide resin (b) in total.

Although the flame retardant is not particularly restricted, for example, the combination of a halogen flame retardant and an antimony compound is preferred. Preferred as the halogen flame retardant are brominated polystyrene, brominated polyphenylene ether, brominated bisphenol-type epoxy polymers, brominated styrene-maleic anhydride polymers, brominated epoxy resin, brominated phenoxy resin, decabromodiphenyl ether, decabromobiphenyl, brominated polycarbonate, perchlorocyclopentadecane, brominated crosslinked aromatic polymers, and the like, and preferred as the antimony compound are antimony trioxide, antimony pentoxide, sodium antimonate, and the like. Of these, the combination of dibromopolystyrene and antimony trioxide is preferred in terms of thermal stability. Moreover, a non-halogen flame retardant may be also used as the flame retardant, and specific examples thereof include melamine cyanurate, red phosphorus, metal salts of phosphinic acid, nitrogen-containing phosphoric acid compounds and the like. In particular, the combination of a metal salt of phosphinic acid and a nitrogen-containing phosphoric acid compound (including, for example, melamine as well as reaction products of condensates of melamine such as melam or melon with polyphosphoric acid or mixtures thereof) is preferred. In the case of including the flame retardant, the content thereof is preferably 0 to 50 parts by mass, more preferably 0 to 40 parts by mass, and even more preferably 0 to 30 parts by mass relative to 100 parts by mass of the polyamide resin (A) (the total of the crystalline polyamide resin (a) and the noncrystalline polyamide resin (b)).

Examples of the release agent include long chain fatty acids and esters or metal salts thereof, amide compounds, polyethylene wax, silicone, polyethylene oxide, and the like. Preferred as the long chain fatty acids are, in particular, those having 12 or more carbon atoms, and examples thereof include stearic acid, 12-hydroxystearic acid, behenic acid, montanic acid and the like which may be esterified with monoglycol or polyglycol or may form a metal salt partly or wholly at all carboxylic acids. Examples of the amide compounds include ethylene bisterephthalamide, methylene bisstearylamide and the like. Either a single release agent or two or more release agents may be used. In the case of including the release agent, the content thereof is preferably 0 to 5 parts by mass, more preferably 0 to 3 parts by mass, and even more preferably 0 to 1 part by mass relative to 100 parts by mass of the polyamide resin (A) (the total of the crystalline polyamide resin (a) and the noncrystalline polyamide resin (b)).

Examples of the sliding improver include high molecular weight polyethylene, acid-modified high molecular weight polyethylene, fluororesin powder, molybdenum disulfide, silicon resin, silicone oil, zinc, graphite, mineral oil and the like. In the case of including the sliding improver, the content thereof is preferably 0.05 to 3 parts by mass relative to 100 parts by mass of the polyamide resin (A) (the total of the crystalline polyamide resin (a) and the noncrystalline polyamide resin (b)).

In the first or second polyamide resin composition may be included as necessary an olefin polymer having a carboxylic acid group and/or a carboxylic anhydride group (modified polyolefin) for the purposes of increasing the reaction efficiency of the glycidyl group-containing styrene copolymer (B) and improving impact resistance. The modified polyolefin is an α-olefin (co)polymer in which a monomer having a carboxylic acid group and/or a carboxylic anhydride group is included in the molecular chain of an unmodified polyolefin by copolymerization or graft polymerization.

Examples of the unmodified polyolefin that can be used in obtaining the olefin polymer mentioned above include, in addition to homopolymers such as polyethylene, polypropylene, polybutene-1, polypentene-1, and polymethylpentene, polyolefins prepared by radically polymerizing at least one member selected from α-olefins such as ethylene, propylene, butene-1, pentene-1,4-methylpentene-1, hexene-1, octene-1, and isobutylene and nonconjugated dienes such as 1,4-hexadiene, dicyclopentadiene, 2,5-norbornadiene, 5-ethylidenenorbornene, 5-ethyl-2,5-norbornadiene, and 5-(1'-propenyl)-2-norbornene by using a usual metal catalyst, a metallocene high-performance catalyst, or the like. Specific examples thereof include ethylene/propylene copolymers, ethylene/butene-1 copolymers, ethylene/hexene-1 copolymers, ethylene/propylene/dicyclopentadiene copolymers, ethylene/propylene/5-ethylidene-2-norbornene copolymers, unhydrogenated or hydrogenated polybutadiene, unhydrogenated or hydrogenated styrene/isoprene/styrene triblock copolymers, unhydrogenated or hydrogenated styrene/butadiene/styrene triblock copolymers, and the like. Of these, examples of the diene elastomers include thermoplastic homopolymers or copolymers which are A-B type or A-B-A' type block copolymerized elastic bodies composed of a vinyl aromatic hydrocarbon and a conjugated diene, wherein the end blocks A and A' may be either the same or different and the aromatic moiety is derived from a monocyclic or polycyclic vinyl aromatic hydrocarbon. Examples of such vinyl aromatic hydrocarbons include styrene, α-methylstyrene, vinyltoluene, vinylxylene, ethylvinylxylene, vinylnaphthalene, mixtures thereof and the like. The intermediate polymer block B is composed of a conjugated diene hydrocarbon, and examples thereof include polymers derived from 1,3-butadiene, 2,3-dimethylbutadiene, isoprene, 1,3-pentadiene, and mixtures thereof. Hydrogenated polymers may be also used as the intermediate polymer block B of the block copolymer.

A method for introducing a carboxylic acid group and/or a carboxylic anhydride group into an unmodified polyolefin is not particularly restricted, and methods such as copolymerization and graft-introduction into the unmodified polyolefin using a radical initiator can be used. The amount of the functional group-containing ingredient introduced is, in the case of copolymerization, preferably within the range of 0.1 to 20 mol %, more preferably 0.5 to 12 mol % relative to all the olefin monomers in the modified polyolefin, whereas in the case of grafting, it is preferably within the range of 0.1 to 10% by mass, more preferably 0.5 to 6% by mass relative to the mass of the modified polyolefin. If the amount of the functional group-containing ingredient introduced is excessively small, an effect of promoting the reaction of the glycidyl group-containing styrene copolymer (B) may not be obtained sufficiently or impact resistance may not be imparted sufficiently, whereas if the amount is excessively large, the stability of melt viscosity may be impaired.

Specific examples of the olefin polymer having a carboxylic acid group and/or a carboxylic anhydride group (modified polyolefin) include maleic anhydride-modified polyethylene, maleic anhydride-modified polypropylene, ethylene/acrylic acid copolymers, ethylene/methacrylic acid copolymers, and substances resulting from converting part or all of the carboxylic acid moieties in the copolymers into salts of sodium, lithium, potassium, zinc, calcium, and the like, ethylene/methyl acrylate copolymers, ethylene/ethyl acrylate copolymers, ethylene/methyl methacrylate copolymers, ethylene/ethyl methacrylate copolymers, ethylene/ethyl acrylate-g-maleic anhydride copolymers ("-g-" indicates graft; the same shall apply hereinafter), ethylene/methyl methacrylate-g-maleic anhydride copolymers, ethylene/propylene-g-maleic anhydride copolymers, ethylene/butene-1-g-maleic anhydride copolymers, ethylene/propylene/1,4-hexadiene-g-maleic anhydride copolymers, ethylene/propylene/dicyclopentadiene-g-maleic anhydride copolymers, ethylene/propylene/2,5-norbornadiene-g-maleic anhydride copolymers, hydrogenated styrene/butadiene/styrene-g-maleic anhydride copolymers, hydrogenated styrene/isoprene/styrene-g-maleic anhydride copolymers, and the like. Of these, preferred are (co)polymers having a carboxylic anhydride group, which is highly reactive with amines.

The first or second polyamide resin composition may comprise another thermoplastic resin other than the polyamide resin (A) as long as the effect of the present invention is not impaired. Examples of the other thermoplastic resin other than the polyamide resin (A) include polyphenylene sulfide (PPS), liquid crystal polymer (LCP), aramid resin, polyetheretherketone (PEEK), polyetherketone (PEK), polyetherimide (PEI), thermoplastic polyimide, polyamideimide (PAI), polyetherketoneketone (PEKK), polyphenylene ether (PPE), polyethersulfone (PES), polysulfone (PSU), polyarylate (PAR), polyethylene terephthalate, polybutylene terephthalate, polyethylene naphthalate, polybutylene naphthalate, polycarbonate (PC), polyoxymethylene (POM), polypropylene (PP), polyethylene (PE), polymethylpentene (TPX), polystyrene (PS), polymethyl methacrylate, acrylonitrile-styrene copolymers (AS), acrylonitrile-butadiene-styrene copolymers (ABS) and the like. In the case where the other thermoplastic resin is less compatible with the polyamide resin (A), a reactive compound or a compatibilizer such as a block polymer may be added or the other thermoplastic resin may be modified (particularly, acid modification is preferred) as necessary. The other thermoplastic resin may be blended in a molten state with the polyamide resin (A) by melt kneading or the other thermoplastic resin may be shaped into a fibrous form or a granular form and then dispersed in the polyamide resin (A). When the other thermoplastic resin is included, the content thereof is preferably 0 to 50 parts by mass, more preferably 0 to 35 parts by mass, and even more preferably 0 to 20 parts by mass relative to 100 parts by mass of the polyamide resin (A) (the total of the crystalline polyamide resin (a) and the noncrystalline polyamide resin (b)).

In the first or second polyamide resin composition, it is also permissible to use, as any of the above-described optional ingredients, a compound, polymer or the like having a substituent to be reacted with the amino group or the carboxyl group of the polyamide resin (A), thereby introducing such a reactive substituent to increase the degree of crosslinking. Examples of the reactive substituent include functional groups such as a glycidyl group, a carboxyl group, metal salts of carboxylic acids, an ester group, a hydroxyl group, an amino group, and a carbodiimide group, functional groups capable of undergoing ring-open addition with polyester ends of lactones, lactides, lactams, and the like; of these, a glycidyl group or a carbodiimide group is preferred from the viewpoint of the rate of reaction. Either only a single substituent or two or more substituents may be used, and different kinds of functional groups may be possessed in one molecule. In the case of introducing the reactive substituent, the amount thereof may be preferably adjusted to within such a range that gelation or the like is not caused by high degree of crosslinking.

The first and the second polyamide resin composition are each a resin composition with which a rheology modification effect suitable for expansion can be obtained. For example, the method described below can be used as a method for examining the rheology modification effect of a polyamide resin composition, but an evaluation method is not limited thereto. Specifically, when a matrix composition composed of the polyamide resin (A) (the crystalline polyamide resin (a) and/or the noncrystalline polyamide resin (b)) and the other resins (e.g., the glycidyl group-containing styrene copolymer (B)) has an α value of a certain value or less and a smaller absolute value of $(\alpha-\beta)$, the expanded state can be said to be good, where a multiplier ($y=ax^\alpha$; a is a constant) taken when a storage modulus (unit: Pa) obtained by melt viscoelasticity measurement within a frequency range of 10 to 100 rad/s in a linear region is plotted on a log-log graph of a frequency (x) and a storage modulus (y) is represented by a, and a multiplier ($y'=bx'^\beta$; b is a constant) taken when a loss modulus (unit: Pa) obtained by melt viscoelasticity measurement within a frequency range of 10 to 100 rad/s in a linear region is plotted on a log-log graph of a frequency (x') and a loss modulus (y') is represented by β.

Generally, expansion in expansion molding is controlled by a process of cooling resin, and the growth of foam cells is formed through the deformation of molten resin under a relatively low shear rate. For this reason, if relaxation behavior in a molten state is excessively fast, walls located between foam cells cannot withstand extension and, as a result, adjoining cells are combined, so that fine foam cells cannot be formed and foam cells become coarser. When the above-mentioned α value determined by melt viscoelasticity measurement within a frequency range of 10 to 100 rad/s where only a small influence is caused by change with time within a measurement time is near 2, which is the theoretical value of a in the case where strain is given and then relaxed rapidly, walls located between cells are ruptured easily during expansion and adjoining cells tend to be combined to become coarser because relaxation behavior in response to melt deformation caused by entanglement of molecules is rapid. The fact that the absolute value of ($\alpha$–$\beta$) becomes larger means that the material behave in a more viscous fashion in a molten state, and there is a tendency that adjoining cells are combined during expansion to become coarser. For example, considering that Nylon 6 and Nylon 66 exhibit behavior approximately with $\alpha$ value=2 and $\beta$ value=0.5, a matrix composition, for example, in which the $\alpha$ value is smaller than 1.4 and the absolute value of ($\alpha$–$\beta$) is 0.5 or less is superior in moldability and productivity in expansion molding and can afford a finely, uniformly expanded molding even if a highly thermally resistant resin called an engineering plastic is used because the composition is modified so that relaxation behavior may be slow during deformation at the time of melting and the melting behavior in an expansion process is in a state where expansion proceeds more easily.

In particular, in the first polyamide resin composition, it is preferred that the matrix composition composed of the polyamide resin (A) and the glycidyl group-containing styrene copolymer (B) has an $\alpha$ value of smaller than 1.4 and an absolute value of ($\alpha$–$\beta$) of 0.5 or less. When a long-term relaxation ingredient is formed through a reaction between the polyamide resin (A) and the glycidyl group-containing styrene copolymer (B), the $\alpha$ value varies because the shear rate dependency of a storage modulus varies. The $\alpha$ value in the case where strain is given and then relaxed rapidly is 2 theoretically, the $\alpha$ value of a polyamide resin when the resin contains no glycidyl group-containing styrene copolymer (B) is generally $\alpha$=1.5 to 2.0. This indicates that in the case where the $\alpha$ value becomes smaller than 1.4 due to the reaction between the polyamide resin (A) and the glycidyl group-containing styrene copolymer (B), a long-term relaxation ingredient is formed due to the reaction between the polyamide resin (A) and the glycidyl group-containing styrene copolymer (B). Moreover, since the $\beta$ value does not depend greatly upon the reaction between the polyamide resin (A) and the glycidyl group-containing styrene copolymer (B), such a melt viscoelastic tendency that the absolute value of ($\alpha$–$\beta$) becomes smaller indicates a tendency that melt tension particularly at low shear becomes higher due to the generation of long-term relaxation ingredients and further indicates to be modification capable of inhibiting cells from becoming coarser through cell rupture during a cell growth process in expansion molding. It is surmised that the first polyamide resin composition falls into a molten state where cells are prevented from becoming coarser through cell rupture during an expansion process as described above, and therefore the composition is superior in moldability and productivity in expansion molding, so that a finely, uniformly expanded molding can be obtained therefrom. Conversely, the case where the $\alpha$ value is 1.4 or more is unsuitable for expansion molding because the polyamide resin does not contain long-term relaxation ingredients. Considering that the $\beta$ value has little dependencies on molecular weight and structure, the fact that the absolute value of ($\alpha$–$\beta$) exceeds 0.5 is undesirable because it indicates that the material is in a molten state closer to a viscous form in a low shear region where foam cells grow and also indicates that walls located between foam cells easily rupture when being in a molten state during expansion.

The first polyamide resin composition can be made to satisfy the conditions that the $\alpha$ value is smaller than 1.4 and that the absolute value of ($\alpha$–$\beta$) is 0.5 or less by performing the reaction between the polyamide resin (A) and the glycidyl group-containing styrene copolymer (B) under appropriate conditions. Specifically, while depending upon the kinds and amounts of the polyamide resin (A), the glycidyl group-containing styrene copolymer (B), and also the inorganic reinforcing material (C), it may be sufficient to use the above-described ingredients (A) to (C) (the polyamide resin (A), the glycidyl group-containing styrene copolymer (B) and, as necessary, the inorganic reinforcing material (C)) in amounts within the above-described content ranges and choose compounding conditions including the extruder screw configuration, temperature setting, screw rotation speed with which a sufficiently high shear stress can be applied to a matrix composition for a time necessary for the reaction between the polyamide resin (A) and the glycidyl group-containing styrene copolymer (B), and the extrusion amount per unit time.

In the preparation of the first or second polyamide resin composition, a method of mixing ingredients (the polyamide resin (A), the glycidyl group-containing styrene copolymer (B), the inorganic reinforcing material (C), additives, etc.) is not particularly restricted. For example, the glycidyl group-containing styrene copolymer (B) and the others optional ingredients (the inorganic reinforcing material (C), additives, etc.) are added to the polyamide resin (A) (the crystalline polyamide resin (a) and/or the noncrystalline polyamide resin (b)) after polymerization. Specifically, there can be applied methods such as 1) adding into a polymerization apparatus after the completion of polymerization, 2) adding directly to a molten polyamide resin just after being discharged from a polymerization apparatus and then kneading, or 3) adding to a solidified (e.g., powdery, pellet-like, or the like) polyamide resin and then melt-kneading. In the method 1) or 2) described above, since the polyamide resin is in a molten state, its melt viscosity is increased directly by the addition of the glycidyl group-containing styrene copolymer (B) and the like, whereas in the method 3), the polyamide resin in which the glycidyl group-containing styrene copolymer (B) and the like are dispersed and mixed uniformly is desirably heated and remelted in order to increase the melt viscosity.

A method of heating and remelting is not particularly restricted, and any method well-known in the art may be used. For example, a single screw extruder, a twin screw extruder, a pressurizing kneader, a Banbury mixer or the like can be used. Of these, particularly a twin screw extruder is preferably used. The operating conditions of a twin screw extruder may vary depending upon various factors such as the kind of the polyamide resin (A) and the kinds and amounts of ingredients and therefore cannot be determined unambiguously, but, for example, the operating temperature may be set at the melting point of the polyamide resin (generally about 170 to 320° C.)+25° C. It may be considered that the melt viscosity reaches a desired value sufficiently within 10 minutes, for example, one minute to several minutes. Regarding the screw configuration of the extruder, it is preferred to incorporate kneading discs superior in kneading at several positions.

The first polyamide resin composition and the second polyamide resin composition obtained in such a manner are high in viscosity stability in their molten states and have melt rheology characteristics suitable particularly for expansion molding.

(Expanded Polyamide Resin Molding)

In the first and second expanded polyamide resin moldings of the present invention, it is preferred that a nonexpanded skin layer located at a surface layer and an expanded layer located at an inner layer are each formed of the polyamide resin composition described above (the first polyamide resin composition or the second polyamide resin composition). The fact that the nonexpanded skin layer and the expanded layer are formed of the above-described specific polyamide resin compositions allows the first and the second expanded polyamide resin moldings to have an expanded structure with a uniform cell state and exhibit superior lightweightness and superior load resistance.

Preferably, the expanded layer is composed of a continuous resin phase and closed foam cells having an average cell diameter of 10 to 300 µm. The continuous resin phase as used herein means a portion formed of a cured polyamide resin composition and containing no vacancies. Regarding the diameter of foam cells (cell diameter), characteristics differing from each other are exhibited both in the case where the cell diameter is small and in the case where the cell diameter is large as long as foam cells are uniform and have no variation in cell diameter and therefore both cases are useful. For example, when the average cell diameter is smaller, higher rigidity can be exhibited for the same weight, whereas when the average cell diameter is larger, cushioning properties and appropriate energy absorption properties in breakage can be obtained. However, it is preferred that the average cell diameter of foam cells is smaller than the thickness of the nonexpanded skin layer because an expanded structure body having an average cell diameter of the thickness of the nonexpanded skin layer or more is disadvantageous in terms of load resistance. Specifically, the average cell diameter is preferably 10 to 300 µm as described above and more preferably 10 to 200 µm though it depends upon the solidification characteristics exhibited by the composition of the polyamide resin (A) (the kinds and blend proportions of the crystalline polyamide resin (a) and the noncrystalline polyamide resin (b)). When the average cell diameter is smaller than 10 µm, the internal pressure of a molding is low and the pressure at the time of forming the nonexpanded skin layer is insufficient, so that defective appearance, such as sink marks, may be formed. Conversely, this may be a result of prevention of cells from growing due to external pressure, but such a case is undesirable because a low specific gravity structure body of interest may not be obtained due to excessive inhibition of cell growth. On the other hand, the case where the average cell diameter exceeds 300 µm is undesirable because load resistance is low and the reinforcing effect by the inorganic reinforcing material (C) with a scale of several µm to several hundreds µm can hardly be expected. If the average cell diameter is within the above-described range, appropriate pressure can be given from the inside of the molding to the nonexpanded skin layer and molding can be performed with external pressure that does not inhibit the growth of cells.

Preferably, the nonexpanded skin is stacked on the expanded layer and has a thickness of 100 to 800 µm. If the thickness of the nonexpanded skin layer is less than 100 µm, there is a tendency that good appearance cannot be obtained, whereas if it exceeds 800 µm, there is a possibility that a below-described expanded structure body having a specific gravity of 0.2 to 1.0 and having a uniform cell state cannot be obtained as a whole expanded molding because the specific gravity of the expanded layer is too low. The thickness of the nonexpanded skin layer is more preferably 120 to 700 µm, and even more preferably 150 to 500 µm.

The first and second expanded moldings of the present invention usually come to have a sandwich structure in which the expanded layers are provided on both sides of the nonexpanded skin layer (in other words, a structure in which the expanded layer is sandwiched on both sides between the nonexpanded skin layers).

Preferably, the specific gravity of each of the first and the second expanded moldings of the present invention is 0.2 to 1.0. Since the specific gravities of common nonreinforced polyamide and inorganically reinforced polyamide are about 1.0 to about 1.8, the expanded molding of the present invention can be said to be reduced in weight sufficiently. The specific gravity is more preferably 0.3 to 0.9. If the specific gravity is less than 0.2, there is a tendency that mechanical characteristics as a load-resistant structure body become excessively low, whereas if the specific gravity exceeds 1.0, sufficient weight reduction cannot be said to be attained.

Although an expansion molding method to be used to obtain the first expanded molding of the present invention is not particularly restricted and a known method may be used, a specific expansion method that involves enlarging a mold at the time of injection molding (henceforth may be referred to as a "mold enlargement method") is preferably used. Naturally, the first expanded molding of the present invention is not limited to a product obtained by this method. On the other hand, the second expanded polyamide resin molding of the present invention is an expanded molding to be obtained by performing expansion molding through the above-described mold enlargement method. The mold enlargement method will be described with reference to drawings below.

Figure 3:
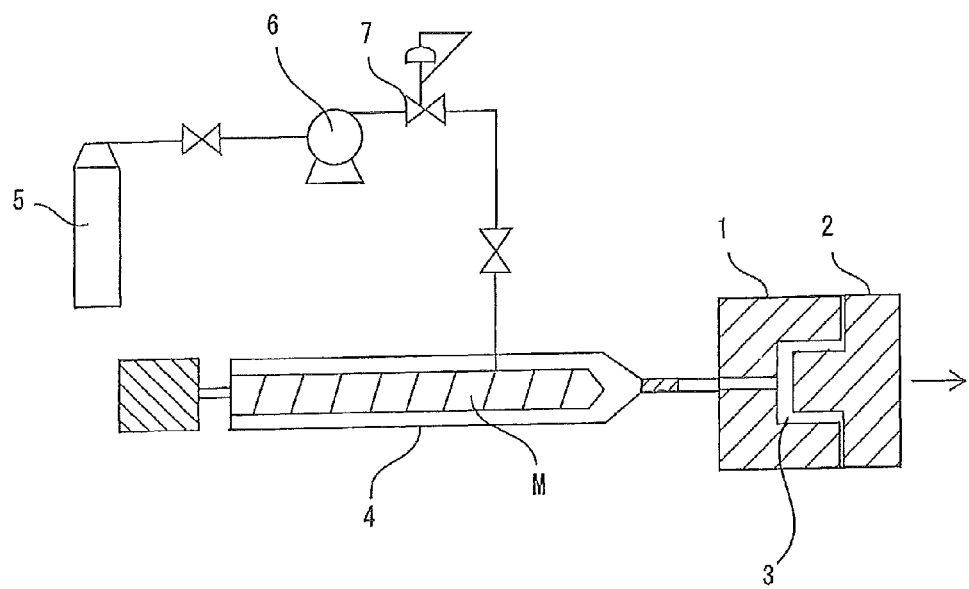
FIG. 3 is a schematic configuration diagram for illustrating one example of a method for producing an expanded polyamide resin molding of the present invention.

The mold enlargement method as used in the present invention is a method for obtaining an expanded molding by injecting and filling a polyamide resin composition M in a molten state together with a chemical foaming agent and/or a supercritical inert gas (henceforth, may be referred to as a "foaming agent" collectively) into a cavity 3 formed by two or more molds 1, 2 closed as shown in FIG. 3, and then at a stage when a nonexpanded skin layer having a thickness of 100 to 800 µm is formed in a surface layer, moving at least one mold (henceforth, may be referred to as "mobile mold") 2 toward the mold opening direction (retracting a core) to enlarge the capacity of the cavity 3. In more detail, the polyamide resin composition M and the foaming agent are filled into the cavity 3, and then the nonexpanded skin layer is formed in the surface layer of the polyamide resin composition M having been filled into the cavity 3. At the stage when the nonexpanded skin layer comes to have a prescribed thickness (100 to 800 µm), the mobile mold 2 is moved toward the mold opening direction, so that the capacity of the cavity 3 is enlarged. The mobile mold 2 can be moved at the stage when the nonexpanded skin layer comes to have the prescribed thickness (100 to 800 µm) by, for example, performing the movement (the core retraction) of the mobile mold 2 within an optimum delay period after filling of the polyamide resin composition M and the like. Thereby, an expanded structure having a more uniform cell state can be formed.

Preferably, the movement rate (core retraction rate) of the mobile mold 2 is within the range of 2 to 10 mm/second for core retraction distances of from 0 mm to 0.5 mm, and within the range of 0.5 to 5 mm/second for core retraction of from 0.5 mm to a prescribed core retraction distance. If the core retraction rate is within the range described above, an expanded structure having a more uniform cell state can be formed. The core retraction rate is not necessarily required to be constant and may appropriately vary as long as it is within the range described above.

The foaming agent that can be used in obtaining the first and second expanded moldings of the present invention is one to be added, as a gas ingredient that serves as a foam nucleus or as a source of the gas ingredient, into a resin that is molten in a resin melting zone of a molding machine.

Specifically, examples of chemical foaming agents that can be used include inorganic compounds such as ammonium carbonate and sodium bicarbonate; organic compounds such as azo compounds, sulfohydrazide compounds, nitroso compounds, and azide compounds; and the like. Examples of the azo compounds include azodicarbonamide (ADCA), 2,2-azoisobutyronitrile, azohexahydrobenzonitrile, diazoaminobenzene and the like, and of these, ADCA is in use with preference. Examples of the sulfohydrazide compounds include benzenesulfohydrazide, benzene-1,3-disulfohydrazide, diphenylsulfone-3,3-disulfonehydrazide, diphenyloxide-4,4-disulfonehydrazide and the like. Examples of the nitroso compounds include N,N-dinitrosopentaethylene tetramine (DNPT), N,N-dimethylterephthalate and the like. Examples of the azide compounds include terephthalazide, p-tertiarybutylbenzazide and the like.

When a chemical foaming agent is used as the foaming agent, it is also permissible, in order to disperse the chemical foaming agent in the polyamide resin (A) uniformly, to use the chemical foaming agent in the form of a foaming agent masterbatch containing as a base material a thermoplastic resin having a melting point lower than the decomposition temperature of the chemical foaming agent. The thermoplastic resin that serves as the base material is not particularly limited as long as it has a melting point lower than the decomposition temperature of the chemical foaming agent, and examples thereof include polystyrene (PS), polyethylene (PE), polypropylene (PP), and the like. In this case, regarding the mixing proportions of the chemical foaming agent and the thermoplastic resin, it is preferable that the amount of the chemical foaming agent is 10 to 100 parts by mass relative to 100 parts by mass of the thermoplastic resin. If the amount of the chemical foaming agent is less than 10 parts by mass, the amount of a masterbatch to be mixed with the polyamide resin (A) becomes excessively large, so that a deterioration in physical properties may be caused, whereas if it exceeds 100 parts by mass, it becomes difficult to prepare a masterbatch due to the problem regarding the dispersibility of the chemical foaming agent.

In the case where supercritical carbon dioxide and/or supercritical nitrogen is used as the foaming agent, the amount thereof is preferably 0.05 to 30 parts by mass, and more preferably 0.1 to 20 parts by mass relative to 100 parts by mass of the resin ingredients in the polyamide resin composition. If the amount of the supercritical carbon dioxide and/or supercritical nitrogen is less than 0.05 parts by mass, it is hard to obtain uniform fine cells, whereas if it exceeds 30 parts by mass, there is a tendency that the appearance of the surface of a molding is deteriorated.

Although the supercritical carbon dioxide or supercritical nitrogen to be used as the foaming agent may be used singly, carbon dioxide and nitrogen may be used in admixture. Nitrogen is suitable for forming finer cells in polyamide, whereas carbon dioxide is suitable for obtaining a higher expansion ratio because it allows a relatively larger injection amount of gas. Therefore, the supercritical carbon dioxide and/or supercritical nitrogen may be mixed optionally according to the state of an expanded structure body. Preferably, the mixing ratio in the case of mixing carbon dioxide and nitrogen is within the range of 1:9 to 9:1.

One possible way for injecting the molten polyamide resin composition M into the cavity 3 together with the foaming agent is to mix the molten polyamide resin composition M with the foaming agent inside the injection molding machine 4. Particularly, in the case of using supercritical carbon dioxide and/or nitrogen as the foaming agent, for example, a method in which gaseous carbon dioxide and/or nitrogen is injected into the injection molding machine 4 from a gas cylinder 5 directly or with pressurization by a pressure booster pump 6 as depicted in FIG. 3 and a method in which liquid carbon dioxide and/or nitrogen is injected into the injection molding machine 4 with a plunger pump can be used. Such carbon dioxide and/or nitrogen needs to be in a supercritical state within the molding machine from the viewpoint of solubility, permeability, and diffusibility in a molten polyamide resin composition.

The "supercritical state" as used herein refers to a state where in the course of raising the temperature and pressure of a substance having a vapor phase and a liquid phase, the distinction between the vapor phase and the liquid phase can be eliminated at a certain temperature region and a certain pressure region; the temperature and the pressure at that time are referred to as critical temperature and critical pressure, respectively. In other words, since a substance simultaneously has characteristics of both gas and liquid in the supercritical state, the fluid generated in this state is referred to as a critical fluid. Since such a critical fluid has a larger density compared with gas and the viscosity thereof is smaller compared with liquid, it has the property of being very easy to diffuse in a substance. Incidentally, carbon dioxide has a critical temperature of 31.2° C. and a critical pressure of 7.38 MPa and nitrogen has a critical temperature of 52.2° C. and a critical pressure of 3.4 MPa; they will fall into their supercritical states and behave as supercritical fluids at or above the critical temperatures and the supercritical pressures.

The resonant frequency, x (Hz), of the second expanded polyamide resin molding of the present invention is preferably 1.5 times or more, more preferably 2.0 times or more the resonant frequency, y (Hz), of a nonexpanded molding obtained by bringing the polyamide resin composition into a molten state, injecting the polyamide resin composition into a cavity formed by two or more molds closed without pouring any chemical foaming agent and/or any supercritical inert gas, and molding the polyamide resin composition without moving any mold in the mold opening direction (in other words, a molding molded without adding any foaming agent and without applying the above-described mold enlargement method). That is, when the value of x/y is within this range, sufficient oscillation resistance can be exhibited. A nonexpanded molding is an object prepared under the same conditions as those used in obtaining the corresponding second expanded polyamide resin molding of the present invention except for adding no foaming agent and failing to retract the mold (failing to enlarge the cavity). Resonant frequency can be measured by, for example, the method disclosed in the Examples described below.

Generally, resonant frequency is proportional to ½ power of the value obtained by dividing an elastic modulus by a specific gravity. Specifically, when a molding has a smaller specific gravity and a higher elastic modulus, the molding has a higher resonant frequency. Mathematically, the value of x/y can be set at 1.5 or more by, for example, setting the elastic modulus of the molding at 1.2-fold or more and setting the specific gravity at 0.5-fold or less. When the value of x/y becomes 2.0 or more, it may be sufficient, for example, that the elastic modulus be 1.6-fold or more and the specific gravity be 0.4-fold or less.

The elastic modulus in the second expanded polyamide molding of the present invention indicates the apparent elastic modulus of a structure body composed of an expanded layer sandwiched between nonexpanded skin layers. Since the second expanded polyamide molding of the present invention has uniform and fine foam cells, a thickness increase effect on elastic modulus is exhibited effectively compared with expanded moldings having uneven coarse foam cells. Specifically, while the elastic modulus of a nonexpanded molding generally increases in proportion to the cube of the thickness, the second expanded polyamide resin molding of the present invention also has the same tendency and the apparent elastic modulus tends to increase with decrease in specific gravity due to an increase in thickness produced by core retraction. In an expanded molding having an uneven expanded layer, namely, in an expanded structure body having an expanded layer with uneven coarse cells, the expanded layer is equivalent to vacancies and the elastic modulus does not increase. Therefore, not only the effect of increasing the elastic modulus proportionally to the cube of the thickness is not obtained, but also the elastic modulus of the expanded molding depends upon a thin nonexpanded skin layer. For this reason, since the elastic modulus of the expanded molding decreases, the resonant frequency does not increase to 1.5-fold or more. Specifically, the value of x/y can be set to 1.5 or more by, for example, preparing an expanded molding having a fine, uniform expanded layer such that the elastic modulus of the molding becomes 1.2-fold or more and the specific gravity becomes 0.5-fold or less relative to the nonexpanded molding. Moreover, the value of x/y can be set to 2.0 or more by, for example, preparing an expanded molding having a fine, uniform expanded layer such that the elastic modulus becomes 1.6-fold or more and the specific gravity becomes 0.4-fold or less.

(Automotive Resin Molding)

The automotive resin molding of the present invention is a molding formed of the second expanded polyamide resin molding of the present invention described above. Such an automotive resin molding is superior in heat resistance and sufficiently lightweight, has high load resistance, and can exert high heat insulating properties and high oscillation resistance. Therefore, the automotive resin molding of the present invention is preferably a thermally resistant cover selected from the group consisting of an engine cover, a cylinder head cover, and a transmission cover.

EXAMPLES

The present invention will be described in more detail below with reference to Examples, but the invention is not limited thereto.

The measured values disclosed in the Examples are values measured by the following methods.

<Number Average Molecular Weight>

Each sample was weighed (2 mg), dissolved in 4 mL of a 10 mM hexafluoroisopropanol (HFIP)/sodium trifluoroacetate solution, and then filtered through a 0.2 μm membrane filter. For the resulting sample solution, gel permeation chromatography (GPC) analysis was conducted under the following conditions to measure a number average molecular weight. The molecular weight was converted in terms of a standard polymethyl methacrylate and was calculated with the exclusion of molecules having molecular weights of 1000 or less as oligomers.
Instrument: "HLC-8220GPC" manufactured by TOSOH
Column: "TSKgel SuperHM-HX2" and "TSKgel SuperH2000" manufactured by TOSOH
Flow rate: 0.25 mL/minute
Concentration: 0.05% by mass
Temperature: 40° C.
Detector: RI <Epoxy Value>

A sample was weighed in a 100-mL Erlenmeyer flask, 10 to 15 mL of methylene chloride was added thereto and the mixture was stirred and dissolved with a magnetic stirrer. A tetraethylammonium bromide reagent (10 mL) was added and further 6 to 8 drops of a Crystal Violet indicator were added, followed by titration with 0.1N perchloric acid. A point where the color changed from blue to green and the green color was kept stable for 2 minutes was designated as an end point. An epoxy value was calculated based on the following formula where the amount (mL) of the perchloric acid needed for titration was represented by A, the weight of the sample was represented by W (g), and the normality of the perchloric acid reagent was represented by N.

Epoxy value$(Eq/1 \times 10^6 \text{ g}) = (N \times A \times 1000)/W$

<Melting Point (Tm)>

A sample (polyamide resin) (10 mg) dried at 105° C. for 15 hours under reduced pressure was weighed into an aluminum pan ("P/N 900793.901" manufactured by TA Instruments), sealed with an aluminum lid ("P/N 900794.901" manufactured by TA Instruments), then heated from room temperature at a rate of 20° C./minute by using a differential scanning calorimeter ("DSC Q100" manufactured by TA Instruments), and held at 350° C. for 3 minutes. Then, the pan was taken out and immersed into liquid nitrogen to cool rapidly. Then, the pan was taken out of the liquid nitrogen and allowed to stand for 30 minutes at room temperature, and then heated from room temperature to 350° C. at a rate of 20° C./minute by using the differential scanning calorimeter, and an endothermic peak temperature due to melting was defined as a melting point (Tm). In the present invention, a sample exhibited no clear endothermic peak temperature in the melting point measurement was determined to be a noncrystalline polyamide (b).

<Specific Gravity>

A specimen of 25 mm×25 mm×thickness having cut faces on four sides was cut out of an expanded molding and the specific gravity thereof was measured in accordance with the method for measuring specific gravity of solid described in JIS-Z8807. In the case where the specimen was separated into two or more sections, such as the case where an expanded layer in a sandwich structure of skin layer/expanded layer/skin layer was formed insufficiently and the top and bottom skin layers was separated, the specific gravity measurement was performed simultaneously using the cut specimen separated into the two or more sections.

<Average Cell Diameter, Uniformity of Cells>

First, a sample for cross section observation was obtained by embedding a molding in a visible light-curable resin and then grinding the resultant to expose an expanded cross section, or by immersing in liquid nitrogen for 10 minutes a molding prepared by forming a notch beforehand such that an expanded cross section would be exposed on breakage and then exposing an expanded cross section by impact breakage.

Regarding the average cell diameter, a photograph of the expanded cross section of the sample for cross section observation taken with a scanning electron microscope was image processed. The cell diameters of at least 100 adjacent cells were designated as cell diameters and the average of the 100 cell diameters was calculated. This operation was carried out at three points and the average of the three averages obtained at the three points was designated as an average cell diameter.

Regarding the uniformity of cells, a photograph of the expanded cross section of the sample for cross section observation taken with a scanning electron microscope was image processed. At three arbitrary points each being a square of 500 μm to 2000 μm on each side and containing at least 20 adjacent cells, when the average cell diameter was 300 μm or shorter and there was no voids having a length continuity of 800 μm or longer, this was indicated by "○" and other conditions were indicated by "x".

When the uniformity of cells was "x" and there were voids having a length continuity of 800 μm or longer, the average cell diameter was considered to be unmeasurable.

<Thickness of Skin Layer>

A sample for cross section observation was obtained by embedding a molding in a visible light-curable resin and then grinding the resultant to expose an expanded cross section, or by immersing in liquid nitrogen for 10 minutes a molding prepared by forming a notch beforehand such that an expanded cross section would be exposed on breakage and then exposing an expanded cross section by impact breakage. Then, a photograph of the expanded cross section of the sample for cross section observation taken with a scanning electron microscope was image processed, and the thickness of an integrated nonexpanded layer found at a surface layer portion was measured as the thickness of a skin layer.

<Productivity>

When a strand was pelletized with a strand cutter in the preparation of a polyamide resin composition, if pellets were obtained without any problems, this was evaluated as "○", whereas if the stranding property was not stable and pellets were not obtained, this was evaluated as "x".

<Load Resistance Improvement Factor>

First, a nonexpanded polyamide resin molding to be used as a reference was prepared by using a flat mold having a width of 100 mm, a length of 250 mm and a thickness of 2 mm under the same conditions as the production conditions for an expanded polyamide molding to be measured except that no foaming agent (nitrogen or carbon dioxide) was used and molding was performed without moving a mold in the mold opening direction (without enlarging the mold).

The expanded polyamide molding obtained and the nonexpanded polyamide resin molding obtained above (a reference) were left at rest under the environment having a temperature of 80° C. and a humidity of 95% for 24 hours, and then from each molding was cut out a specimen having a width of 10 mm and a length of 100 mm. When a three-point bending test was performed at a span length of 50 mm and a loading rate of 2 mm/minute for the cut specimens, the maximum load of the nonexpanded molding was represented by X (N) and the maximum load of the expanded molding was represented by Y (N). The case where the value of Y/X was 1.5 or more was evaluated as "○", the case where the value was 1 or more and less than 1.5 was evaluated as "Δ", the case where the value was less than 1, or the nonexpanded skin layer and the expanded layer in the lower portion were not broken simultaneously because the expanded layer in the upper portion had been cavitated, but only the nonexpanded skin layer in the upper portion was broken was evaluated as "x".

<Melt Viscoelasticity Measurement>

In order to determine the α value and the β value each described above in the melt viscoelasticity measurement of a matrix composition composed of a polyamide resin (A) and a glycidyl group-containing styrene copolymer (B), a melt viscoelasticity measurement within the frequency range of 10 to 100 rad/s in a linear region was carried out, a log-log graph of a frequency (x) and a storage modulus (y) and a log-log graph of a frequency (x') and a loss modulus (y') were obtained as frequency-dependent data. The matrix compositions to be used for the measurement were prepared in the same manner as in Examples and Comparative Examples except for failing to use an inorganic reinforcing material (C) and additives (a stabilizer, a release layer, and black pigment).

Figure 4:
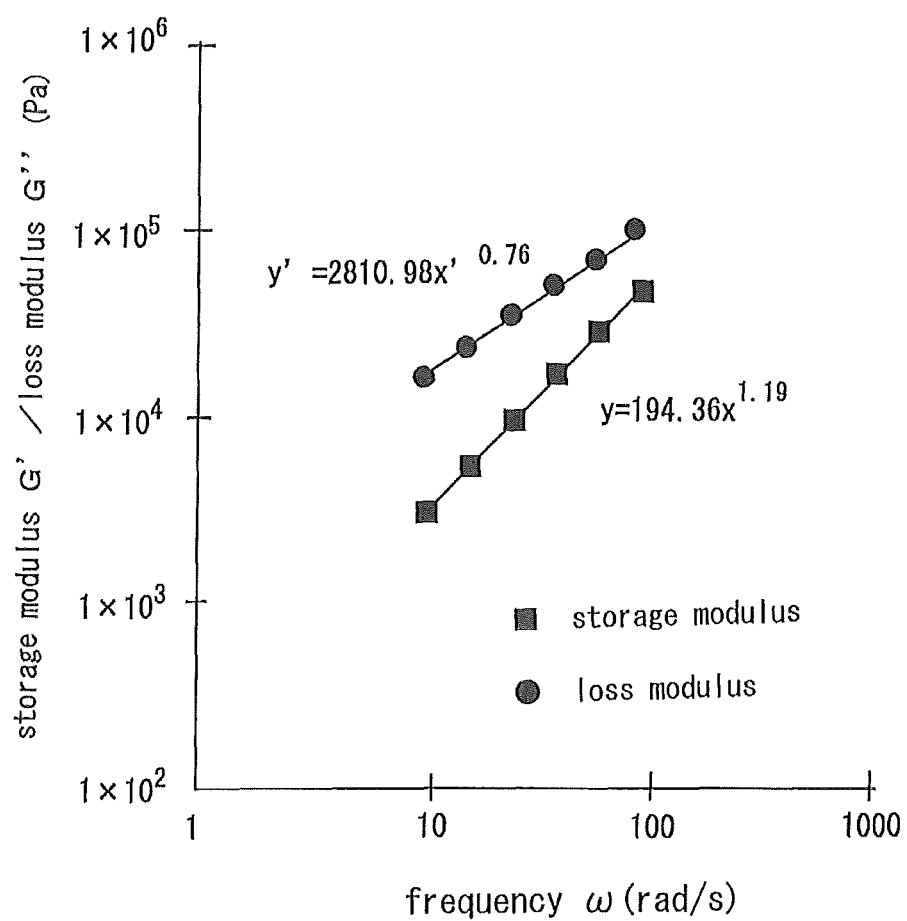
FIG. 4 is a graph of the frequency-dependent data of the storage elastic modulus and the loss elastic modulus obtained by the melt viscoelasticity measurement of the matrix composition in Example 1-4.
Figure 5:
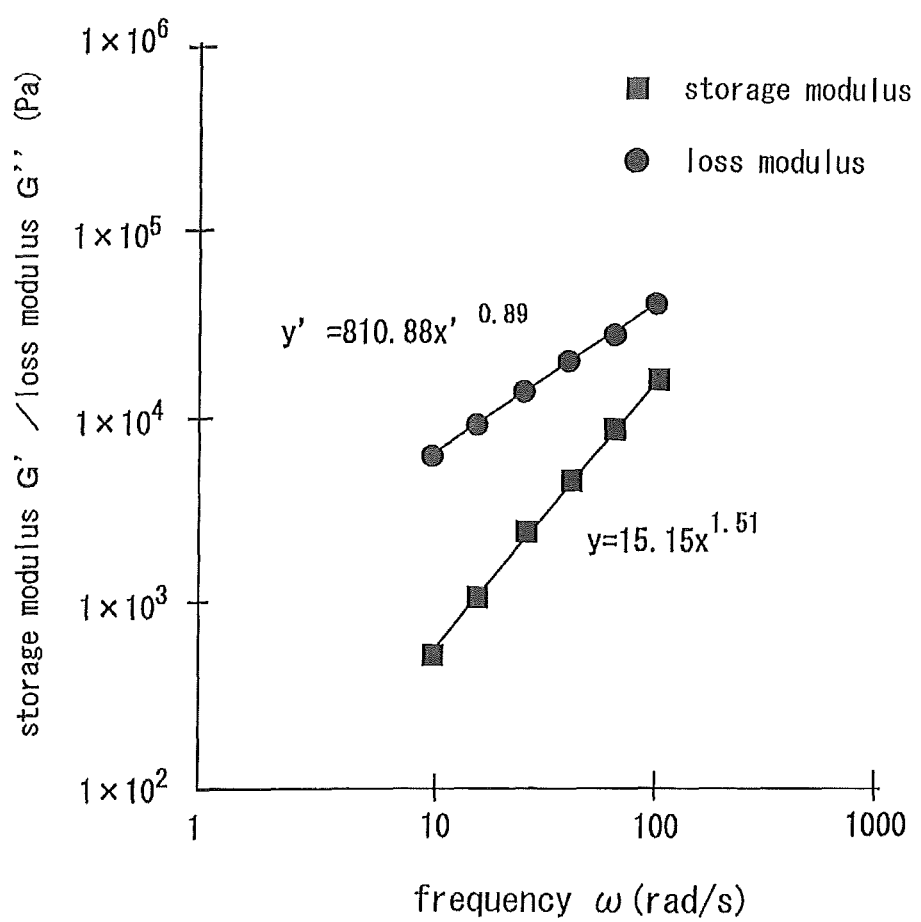
FIG. 5 is a graph of the frequency-dependent data of the storage elastic modulus and the loss elastic modulus obtained by the melt viscoelasticity measurement of the matrix composition in Comparative Example 1-1.

The melt viscoelasticity measurement (dynamic viscoelasticity measurement) was carried out under the conditions disclosed below by using "ARES" manufactured by TA Instruments and a parallel plate of 25 mm as a measurement jig, and a log-log plot of frequency ω (x)-storage modulus G' (y) and a log-log plot of frequency ω (x')-loss modulus G" (y') were obtained. A graph showing the result of Example 1-4 and a graph showing the result of Comparative Example 1-1 are shown in FIG. 4 and in FIG. 5, respectively. In the determination of the slope of the storage modulus (α value) and the slope of the loss modulus (β value) from the plots, straight lines were drawn on the plots by the exponential approximations of the obtained data points, and then the slopes of the straight lines were determined. Measurement was carried at 230° C. in examples where "Polyamide 11" was used as the polyamide resin (A), at 240° C. in examples where "Polyamide 6-1 or 6-2" was used as the polyamide resin (A), and at 280° C. in examples where "Polyamide 66" was used as the polyamide resin (A).

Strain=10%
Temperature=at least 10° C. higher than the melting point of DSC
Initial frequency=100 rad/s
Final frequency=10 rad/s
Gap=0.7 to 1.5 mm
Geometry Type=Parallel Plate (Diameter=25 mm)

<Appearance>

The surface condition of an expanded molding obtained was observed visually. The case where unevenness caused by, for example, surface float of an inorganic reinforcing material (glass, etc.) was not found on the surface and the surface was in a beautiful condition without any defects in appearance such as silver streaks or flash visually observable was evaluated as "○" and the case where an inorganic reinforcing material (glass, etc.) was floated on the surface, so that unevenness was observed or the case where sink marks, silver streaks, or flash could be confirmed visually was evaluated as "x".

<Oscillation Characteristics (Resonant Frequency, Resonant Frequency Increase Factor)>

First, a nonexpanded polyamide resin molding to be used as a reference was prepared by using a flat mold having a width of 100 mm, a length of 250 mm and a thickness of 2 mm under the same conditions as the production conditions for an expanded polyamide molding to be measured except that no foaming agent (nitrogen or carbon dioxide) was used and molding was performed without moving a mold in the mold opening direction (without enlarging the mold).

Figure 8:
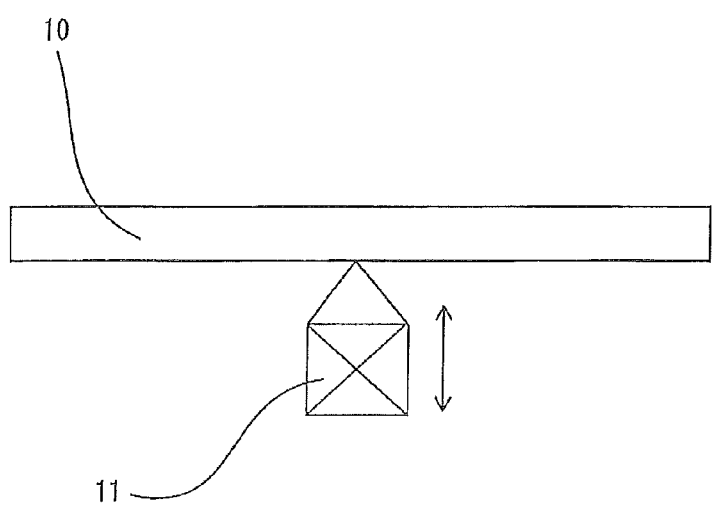
FIG. 8 is a schematic configuration diagram for illustrating a method of evaluating oscillation characteristics.

Out of each of the expanded polyamide resin molding obtained and the nonexpanded polyamide resin molding obtained above was cut out a specimen having a width of 10 mm and a length of 100 mm, and then these were subjected to an oscillation resistance test by the central excitation method in accordance with ISO 6721-1. Specifically, the center of a specimen 10 is fixed to an exciter 11 as depicted in FIG. 8, and oscillation was applied from the exciter 11 in the vertical direction (the direction indicated by the arrow in the drawing) under an atmosphere of 23° C., 50% RH. An acceleration response was Fourier transformed in accordance with ISO 6721-1 to calculate a frequency response and determine a resonant frequency. Then, the resonant frequency of the expanded polyamide resin molding was represented by x, that of the nonexpanded polyamide resin molding was represented by y, and the value of x/y was taken as a resonant frequency increase factor.

<Heat Insulation Property (Temperature of the Side Opposite from Heat Source)>

Figure 9:
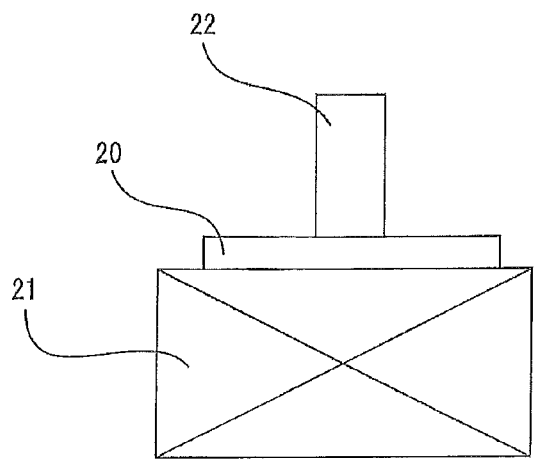
FIG. 9 is a schematic constitution diagram for illustrating a method of evaluating heat insulation characteristics.
Figure 10:
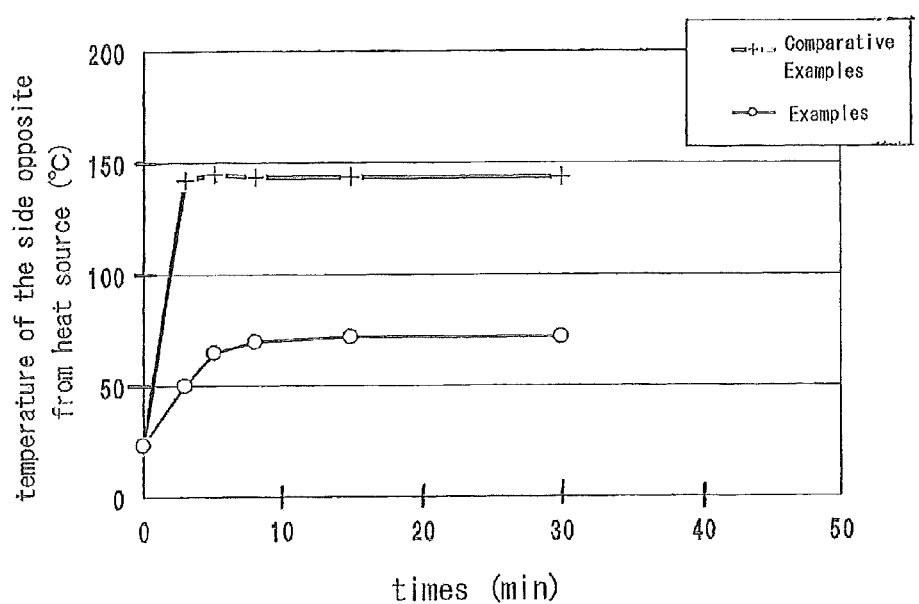
FIG. 10 is a graph that shows the results of the evaluation of the heat insulation characteristics of the expanded polyamide resin molding of Example 2-20 and the expanded polyamide resin molding of Comparative Example 2-3.

As shown in FIG. 9, a resulting expanded molding 20 was placed on a heat source (hot plate) 21 set at 150° C., the temperature change on the side opposite from the heat source was measured with a temperature sensor 22 for 30 minutes, and the temperature of 30 minutes later was taken as the temperature of the side opposite from the heat source. For reference, FIG. 10 shows the change with time in the temperature of the side opposite from the heat source detected when the heat insulation characteristics were evaluated for the expanded polyamide resin molding of Example 2-20 and the expanded polyamide resin molding of Comparative Example 2-3.

The following raw materials were used in each of Examples and Comparative Examples.

<Polyamide Resin (A) (Crystalline Polyamide Resin (a))> a1: Polyamide 6-1; "Nylon T-820" produced by Toyobo Co., Ltd., 6 Nylon having a relative viscosity RV of 3.1, number average molecular weight 25400, melting point 225° C.

a2: Polyamide 6-2; "Nylon T-840" produced by Toyobo Co., Ltd., 6 Nylon having a relative viscosity RV of 2.4, number average molecular weight 17700, melting point 225° C.

a3: Polyamide 66-1; "Amilan (registered trademark) CM3001N" produced by Toray Industries, Inc., 66 Nylon having a relative viscosity RV of 2.8, number average molecular weight 17900, melting point 265° C.

a4: Polyamide 11; "Rilsan (registered trademark) B BMNO" produced by Arkema Inc., 11 Nylon having a relative viscosity RV of 2.1, melting point 187° C.

<Polyamide resin (A) (crystalline polyamide resin (b))> b1: Polyamide 6T6I; "GRIVORY G21" produced by EMS, 6T/6I=33/67 (mol %), Tg 125° C., number average molecular weight 15100, noncrystalline b2: Polyamide PACM14; "G350" produced by Arkema Inc., Tg 146° C., number average molecular weight 14200, noncrystalline b3: Polyamide MACM12 •I; "TR-55" produced by EMS, Tg 162° C., number average molecular weight 18600, noncrystalline <Glycidyl Group-Containing Styrene Copolymer (B)>

B1: Styrene polymer 1; this was produced as follows.

Specifically, the oil jacket temperature of a 1-L pressurized stirred vessel type reactor with an oil jacket was maintained at 200° C. On the other hand, a raw material tank was charged with a monomer mixed liquid composed of 89 parts by mass of styrene (St), 11 parts by mass of glycidyl methacrylate (GMA), 15 parts by mass of xylene (Xy), and 0.5 parts by mass of ditertiary-butyl peroxide (DTBP) as a polymerization initiator. This was fed from the raw material tank to the reactor continuously at a constant feeding rate (48 g/minute, residence time: 12 minutes), and a reaction liquid was extracted through an outlet of the reactor continuously so that the mass of the liquid contained in the reactor became constant at about 580 g. At this time, the temperature within the reactor was kept at about 210° C. After a lapse of 36 minutes since the temperature within the reactor was stabilized, the reaction liquid extracted was led into a thin film evaporator kept at a degree of pressure reduction of 30 kPa and a temperature of 250° C. to remove volatile ingredients continuously, so that a styrene polymer (B1) was obtained. This styrene copolymer (B1) had a weight average molecular weight of 8500 and a number average molecular weight of 3300 according to GPC analysis (in terms of polystyrene). It has an epoxy value of 670 Eq/1×10$^6$ g and an epoxy value number (the average number of epoxy groups per molecule) of 2.2, and it has two or more glycidyl groups in one molecule.

B2: Styrene polymer 2; this was produced as follows.

Specifically, a styrene polymer (B2) was obtained in the same manner as in the production of the styrene polymer (B1) described above except for using a monomer mixed liquid composed of 77 parts by mass of St, 23 parts by mass of GMA, 15 parts by mass of Xy, and 0.3 parts by mass of DTBP. This styrene copolymer (B2) had a weight average molecular weight of 9700 and a number average molecular weight of 3300 according to GPC analysis (in terms of polystyrene). It has an epoxy value of 1400 Eq/1×10$^6$ g and an epoxy value number (the average number of epoxy groups per molecule) of 4.6, and it has two or more glycidyl groups in one molecule.

<Inorganic Reinforcing Material (C)>

C1: Glass fiber 1; "CS3PE453" produced by Nitto Boseki Co., Ltd.

C2: Glass fiber 2; "CSG3PA810S" produced by Nitto Boseki Co., Ltd.

C3: Layered silicate; "Cloisite30B" produced by Southern Clay Products, Inc., organically treated montmorillonite C4: Glass beads; "GB731A-PN" produced by Potters-Ballotini Co., Ltd.

<Other Additives>

Stabilizer: "IRGANOX B1171" produced by Ciba Japan K.K.

Release agent: "montan acid ester wax WE40" produced by Clariant Japan

Black pigment: "EPC8E313" produced by Sumika Color Co., Ltd.

Examples 1-1 to 1-39 and Comparative Examples 1-1 to 1-16

The use amounts of the above-described raw materials (A) to (C) were determined as shown in Tables 1 to 6, and regarding the use amounts of other additives in Examples and Comparative Examples, the amount of the stabilizer was set to 0.3 parts by mass, the amount of the release agent was set to 0.3 parts by mass, and the amount of the black pigment was set to 1.0 part by mass. These materials were mixed with a 35φ twin screw extruder (manufactured by Toshiba Machine Co., Ltd.). Specifically, the polyamide resin (A), the glycidyl group-containing styrene copolymer (B), and the other additives (the stabilizer, the release agent, and the black pigment) were charged first simultaneously through a hopper at a screw rotation speed of 100 rpm, followed by melt-kneading, and then the inorganic reinforcing material (C) was charged by side feeding. At this time, the cylinder temperature was set to 280° C. when polyamide 66-1 (a3) was used as the polyamide resin (A) and set to 250° C. when polyamide 6-1 (a1), polyamide 6-2 (a2), or polyamide 11 (a4) was used. Only when using the layered silicate (C3) as the inorganic reinforcing material (C), it had been exfoliated at between layers beforehand and had been dispersed in nanometer order in the polyamide resin (A). A strand discharged from the extruder was cooled in a water bath, and then was pelletized with a strand cutter, followed by drying at 125° C. for 5 hours, so that a first polyamide resin composition was obtained in the form of pellets.

Next, an expanded molding was prepared by the mold enlargement method described above using the first polyamide resin composition obtained above. There was used, as a mold, a mold for flat panel production (mold A) composed of a stationary mold and a mobile mold capable of forming a cavity being 100 mm in width, 250 mm in length, and 2 mm in thickness when being closed. Specifically, supercritical nitrogen or supercritical carbon dioxide was injected in the amount (parts by mass: relative to 100 parts by mass of the resin ingredients in the polyamide resin composition) provided in the respective tables at a plasticizing region of an electric injection molding machine having a mold clamping force of 1800 kN, a screw diameter of 42 mm, and a screw with L/D of 30. After injecting and filling into the mold A, the surface temperature of which was controlled at 40 to 60° C. (an optimum condition was chosen therebetween), the mobile mold was moved to the mold opening direction by a length provided as the amount (mm) of core retraction in the respective table to enlarge the capacity of the cavity, so that an expanded molding was obtained. At this time, the delay time from the completion of injection to the start of core retraction was set to 0 seconds to 0.5 seconds (an optimum condition was chosen therebetween), the movement speed of the mobile mold (core retraction speed) was set to an arbitrary speed within the range of 2 to 10 mm/second (an optimum condition was chosen therebetween) for core retraction distances of from 0 mm to 0.5 mm, and also to an arbitrary speed within the range of 0.5 to 5 mm/second (an optimum condition was chosen therebetween) for core retraction distances of from 0.5 mm to the amount (mm) of core retraction given in the respective tables.

The evaluation results of the expanded polyamide resin moldings obtained in Examples 1-1 to 1-39 and Comparative Examples 1-1 to 1-16 are shown in Tables 1 to 6.

TABLE 1

| | | | | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|---|---|
| (A) | a1 | Polyamide 6-1 | parts by mass | 69 | 67 | 65 | 60 | | | | | | |
| | a2 | Polyamide 6-2 | parts by mass | | | | | 57 | 47 | 47 | | 47 | 47 |
| | a3 | Polyamide 66-1 | parts by mass | | | | | | | | 47 | | |
| | a4 | Polyamide 11 | parts by mass | | | | | | | | | | |
| | b1 | Polyamide 6T6I | parts by mass | | | | | 10 | 10 | 20 | 20 | 20 | |
| | b2 | Polyamide PACM14 | parts by mass | | | | | | | | | 20 | |
| | b3 | Polyamide MACM12-I | parts by mass | | | | | | | | | | 20 |
| (B) | B1 | Styrene polymer 1 | parts by mass | 1 | 3 | 5 | 5 | 3 | 3 | | | 3 | 3 |
| | B2 | Styrene polymer 2 | parts by mass | | | | | | | 3 | 3 | | |
| (C) | C1 | Glass fiber 1 | parts by mass | 30 | 30 | 30 | 30 | 30 | 30 | 30 | 30 | 30 | 30 |
| | C2 | Glass fiber 2 | parts by mass | | | | | | | | | | |
| | C3 | Layered silicate | parts by mass | | | | | | | | | | |
| | C4 | Glass beads | parts by mass | | | | | | | | | | |
| Production conditions | Productivity | | | ○ | ○ | ○ | ○ | ○ | ○ | ○ | ○ | ○ | ○ |
| | Nitrogen | | parts by mass | 0.2 | 0.2 | 0.2 | 0.2 | 0.2 | 0.2 | 0.2 | 0.2 | 0.2 | 0.2 |
| | Core retraction | | mm | 3.0 | 3.0 | 3.0 | 3.0 | 3.0 | 3.0 | 3.0 | 3.0 | 3.0 | 3.0 |
| Characteristics of molding | Thickness of molding | | mm | 4.9 | 4.8 | 4.9 | 5.0 | 5.0 | 4.8 | 4.9 | 5.0 | 5.0 | 4.9 |
| | Specific gravity | | | 0.54 | 0.53 | 0.54 | 0.54 | 0.53 | 0.52 | 0.53 | 0.54 | 0.54 | 0.53 |
| | Average cell diameter | | μm | 118 | 110 | 95 | 90 | 124 | 110 | 118 | 125 | 112 | 121 |
| | Uniformity of cells | | | ○ | ○ | ○ | ○ | ○ | ○ | ○ | ○ | ○ | ○ |
| | Thickness of skin layer | | μm | 352 | 356 | 361 | 347 | 381 | 376 | 351 | 382 | 392 | 370 |
| | Load resistance improvement factor | | | ○ | ○ | ○ | ○ | ○ | ○ | ○ | ○ | ○ | ○ |
| | α | | | 1.39 | 1.38 | 1.22 | 1.19 | 1.25 | 1.22 | 1.25 | 1.38 | 1.36 | 1.37 |
| | Absolute value of (α-β) | | | 0.48 | 0.45 | 0.44 | 0.43 | 0.45 | 0.48 | 0.47 | 0.47 | 0.47 | 0.46 |

TABLE 2

| | | | | Example 1-11 | Example 1-12 | Example 1-13 | Example 1-14 | Example 1-15 | Example 1-16 | Example 1-17 | Example 1-18 | Example 1-19 | Example 1-20 |
|---|---|---|---|---|---|---|---|---|---|---|---|---|---|
| (A) | a1 | Polyamide 6-1 | parts by mass | 65 | 65 | 90 | 65 | 65 | 95 | | 75 | 42 | 42 |
| | a2 | Polyamide 6-2 | parts by mass | | | | | | | | | | |
| | a3 | Polyamide 66-1 | parts by mass | | | | | | | | | | |
| | a4 | Polyamide 11 | parts by mass | | | | | | | 95 | | | |
| | b1 | Polyamide 6T6I | parts by mass | | | | | | | | 10 | 10 | 10 |
| | b2 | Polyamide PACM14 | parts by mass | | | | | | | | | | |
| | b3 | Polyamide MACM12-I | parts by mass | | | | | | | | | | |
| (B) | B1 | Styrene polymer 1 | parts by mass | 5 | 5 | 5 | 5 | | | | 5 | 3 | 3 |
| | B2 | Styrene polymer 2 | parts by mass | | | | | 5 | 5 | 5 | | | |
| (C) | C1 | Glass fiber 1 | parts by mass | 30 | | | | 30 | | | 10 | 45 | |
| | C2 | Glass fiber 2 | parts by mass | | 30 | | | | | | | | 45 |
| | C3 | Layered silicate | parts by mass | | | | 5 | | | | | | |
| | C4 | Glass beads | parts by mass | | | | | 30 | | | | | |
| Production conditions | Productivity | | | ○ | ○ | ○ | ○ | ○ | ○ | ○ | ○ | ○ | ○ |
| | Nitrogen | | parts by mass | 0.2 | 0.2 | 0.2 | 0.2 | 0.2 | 0.2 | 0.2 | 0.2 | 0.2 | 0.2 |
| | Core retraction | | mm | 3.0 | 3.0 | 3.0 | 3.0 | 3.0 | 3.0 | 3.0 | 3.0 | 3.0 | 3.0 |

TABLE 2-continued

|  |  |  | Example 1-11 | Example 1-12 | Example 1-13 | Example 1-14 | Example 1-15 | Example 1-16 | Example 1-17 | Example 1-18 | Example 1-19 | Example 1-20 |
|---|---|---|---|---|---|---|---|---|---|---|---|---|
| Characteristics of molding | Thickness of molding | mm | 5.0 | 4.9 | 5.0 | 4.8 | 4.9 | 4.7 | 4.8 | 4.9 | 4.9 | 5.0 |
|  | Specific gravity |  | 0.54 | 0.55 | 0.49 | 0.54 | 0.53 | 0.45 | 0.42 | 0.48 | 0.59 | 0.58 |
|  | Average cell diameter | μm | 105 | 98 | 126 | 128 | 100 | 132 | 123 | 111 | 95 | 100 |
|  | Uniformity of cells |  | ○ | ○ | ○ | ○ | ○ | ○ | ○ | ○ | ○ | ○ |
|  | Thickness of skin layer | μm | 372 | 368 | 293 | 391 | 367 | 295 | 320 | 355 | 382 | 340 |
|  | Load resistance improvement factor |  | ○ | ○ | ○ | ○ | ○ | ○ | ○ | ○ | ○ | ○ |
|  | α |  | 1.23 | 1.23 | 1.31 | 1.23 | 1.28 | 1.38 | 1.10 | 1.35 | 1.31 | 1.31 |
|  | Absolute value of (α-β) |  | 0.44 | 0.44 | 0.45 | 0.44 | 0.37 | 0.41 | 0.28 | 0.40 | 0.42 | 0.43 |

TABLE 3

|  |  |  |  | Example 1-21 | Example 1-22 | Example 1-23 | Example 1-24 | Example 1-25 | Example 1-26 | Example 1-27 | Example 1-28 | Example 1-29 | Example 1-30 |
|---|---|---|---|---|---|---|---|---|---|---|---|---|---|
| (A) | a1 | Polyamide 6-1 | parts by mass | 95 | 95 | 95 | 95 |  | 90 | 90 | 56 | 56 |  |
|  | a2 | Polyamide 6-2 | parts by mass |  |  |  |  |  |  |  |  |  |  |
|  | a3 | Polyamide 66-1 | parts by mass |  |  |  |  |  |  |  |  |  |  |
|  | a4 | Polyamide 11 | parts by mass |  |  |  |  | 95 |  |  |  |  | 76 |
|  | b1 | Polyamide 6T6I | parts by mass |  |  |  |  |  |  |  | 10 | 10 |  |
|  | b2 | Polyamide PACM14 | parts by mass |  |  |  |  |  |  |  |  |  |  |
|  | b3 | Polyamide MACM12-I | parts by mass |  |  |  |  |  |  |  |  |  |  |
| (B) | B1 | Styrene polymer 1 | parts by mass | 5 | 5 | 5 | 5 | 5 | 5 | 5 | 4 | 4 | 4 |
|  | B2 | Styrene polymer 2 | parts by mass |  |  |  |  |  |  |  |  |  |  |
| (C) | C1 | Glass fiber 1 | parts by mass |  |  |  |  |  |  |  | 30 | 30 |  |
|  | C2 | Glass fiber 2 | parts by mass |  |  |  |  |  |  |  |  |  |  |
|  | C3 | Layered silicate | parts by mass |  |  |  |  |  | 5 | 5 |  |  |  |
|  | C4 | Glass beads | parts by mass |  |  |  |  |  |  |  |  |  | 20 |
| Production conditions | Productivity |  |  | ○ | ○ | ○ | ○ | ○ | ○ | ○ | ○ | ○ | ○ |
|  | Nitrogen | parts by mass |  | 0.2 | 0.2 | 0.2 | 0.2 | 0.2 | 0.2 | 0.2 | 0.2 | 0.2 | 0.2 |
|  | Core retraction | mm |  | 1.0 | 3.0 | 6.0 | 6.0 | 6.0 | 3.0 | 6.0 | 3.0 | 4.0 | 4.0 |
| Characteristics of molding | Thickness of molding | mm |  | 3.0 | 5.8 | 7.6 | 7.8 | 7.7 | 5.0 | 7.6 | 5.0 | 5.9 | 5.9 |
|  | Specific gravity |  |  | 0.76 | 0.38 | 0.32 | 0.33 | 0.30 | 0.48 | 0.32 | 0.54 | 0.45 | 0.41 |
|  | Average cell diameter | μm |  | 92 | 111 | 136 | 122 | 115 | 98 | 116 | 95 | 86 | 89 |
|  | Uniformity of cells |  |  | ○ | ○ | ○ | ○ | ○ | ○ | ○ | ○ | ○ | ○ |
|  | Thickness of skin layer | μm |  | 312 | 298 | 278 | 262 | 273 | 287 | 286 | 376 | 365 | 333 |
|  | Load resistance improvement factor |  |  | ○ | ○ | ○ | ○ | ○ | ○ | ○ | ○ | ○ | ○ |
|  | α |  |  | 1.38 | 1.38 | 1.38 | 1.38 | 1.35 | 1.37 | 1.37 | 1.19 | 1.19 | 1.10 |
|  | Absolute value of (α-β) |  |  | 0.41 | 0.41 | 0.41 | 0.40 | 0.35 | 0.40 | 0.40 | 0.39 | 0.39 | 0.32 |

TABLE 4

|  |  |  |  | Example 1-31 | Example 1-32 | Example 1-33 | Example 1-34 | Example 1-35 | Example 1-36 | Example 1-37 | Example 1-38 | Example 1-39 |
|---|---|---|---|---|---|---|---|---|---|---|---|---|
| (A) | a1 | Polyamide 6-1 | parts by mass | 65 | 65 | 65 | 65 | 65 | 65 | 75 | 75 | 75 |
|  | a2 | Polyamide 6-2 | parts by mass |  |  |  |  |  |  |  |  |  |
|  | a3 | Polyamide 66-1 | parts by mass |  |  |  |  |  |  |  |  |  |
|  | a4 | Polyamide 11 | parts by mass |  |  |  |  |  |  |  |  |  |
|  | b1 | Polyamide 6T6I | parts by mass |  |  |  |  |  |  |  |  |  |
|  | b2 | Polyamide PACM14 | parts by mass |  |  |  |  |  |  |  |  |  |
|  | b3 | Polyamide MACM12-I | parts by mass |  |  |  |  |  |  |  |  |  |
| (B) | B1 | Styrene polymer 1 | parts by mass | 5 | 5 | 5 | 5 | 5 | 5 | 5 | 5 | 5 |
|  | B2 | Styrene polymer 2 | parts by mass |  |  |  |  |  |  |  |  |  |
| (C) | C1 | Glass fiber 1 | parts by mass | 30 | 30 | 30 | 30 | 30 | 30 |  |  |  |
|  | C2 | Glass fiber 2 | parts by mass |  |  |  |  |  |  | 20 | 20 | 20 |
|  | C3 | Layered silicate | parts by mass |  |  |  |  |  |  |  |  |  |
|  | C4 | Glass beads | parts by mass |  |  |  |  |  |  |  |  |  |
| Production conditions | Productivity |  |  | ○ | ○ | ○ | ○ | ○ | ○ | ○ | ○ | ○ |
|  | Nitrogen/Carbon dioxide | parts by mass |  | 0.1/— | 0.2/— | 0.3/— | —/0.2 | —/0.4 | —/0.8 | 0.1/— | 0.2/— | 0.3/— |
|  | Core retraction | mm |  | 3.0 | 3.0 | 3.0 | 3.0 | 3.0 | 3.0 | 3.0 | 3.0 | 3.0 |
| Characteristics of molding | Thickness of molding | mm |  | 4.9 | 4.8 | 4.7 | 4.7 | 4.8 | 4.8 | 4.9 | 4.9 | 5.0 |
|  | Specific gravity |  |  | 0.54 | 0.53 | 0.54 | 0.53 | 0.53 | 0.52 | 0.50 | 0.51 | 0.49 |
|  | Average cell diameter | μm |  | 121 | 98 | 95 | 136 | 145 | 141 | 120 | 97 | 96 |
|  | Uniformity of cells |  |  | ○ | ○ | ○ | ○ | ○ | ○ | ○ | ○ | ○ |

TABLE 4-continued

|  |  | Example 1-31 | Example 1-32 | Example 1-33 | Example 1-34 | Example 1-35 | Example 1-36 | Example 1-37 | Example 1-38 | Example 1-39 |
|---|---|---|---|---|---|---|---|---|---|---|
| Thickness of skin layer | μm | 362 | 375 | 366 | 368 | 345 | 312 | 382 | 369 | 372 |
| Load resistance improvement factor |  | ○ | ○ | ○ | ○ | ○ | ○ | ○ | ○ | ○ |
| α |  | 1.22 | 1.22 | 1.22 | 1.22 | 1.22 | 1.22 | 1.37 | 1.37 | 1.37 |
| Absolute value of (α-β) |  | 0.44 | 0.44 | 0.44 | 0.44 | 0.44 | 0.42 | 0.42 | 0.42 | 0.42 |

TABLE 5

|  |  |  |  | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 |
|---|---|---|---|---|---|---|---|---|---|---|---|
| (A) | a1 | Polyamide 6-1 | parts by mass | 70 |  |  |  | 55 | 70 | 95 | 70 |
|  | a2 | Polyamide 6-2 | parts by mass |  | 70 |  |  |  |  |  |  |
|  | a3 | Polyamide 66-1 | parts by mass |  |  | 70 |  |  |  |  |  |
|  | a4 | Polyamide 11 | parts by mass |  |  |  | 70 |  |  |  |  |
|  | b1 | Polyamide 6T6I | parts by mass |  |  |  |  |  |  |  |  |
|  | b2 | Polyamide PACM14 | parts by mass |  |  |  |  |  |  |  |  |
|  | b3 | Polyamide MACM12-I | parts by mass |  |  |  |  |  |  |  |  |
| (B) | B1 | Styrene polymer 1 | parts by mass |  |  |  |  | 15 |  |  |  |
|  | B2 | Styrene polymer 2 | parts by mass |  |  |  |  |  |  |  |  |
| (C) | C1 | Glass fiber 1 | parts by mass | 30 | 30 | 30 | 30 | 30 |  |  |  |
|  | C2 | Glass fiber 2 | parts by mass |  |  |  |  |  | 30 |  |  |
|  | C3 | Layered silicate | parts by mass |  |  |  |  |  |  | 5 |  |
|  | C4 | Glass beads | parts by mass |  |  |  |  |  |  |  | 30 |
| Production conditions | Productivity |  |  | ○ | ○ | ○ | ○ | X | ○ | ○ | ○ |
|  | Nitrogen | parts by mass |  | 0.2 | 0.2 | 0.2 | 0.2 |  | 0.2 | 0.2 | 0.2 |
|  | Core retraction | mm |  | 3.0 | 3.0 | 3.0 | 3.0 |  | 3.0 | 3.0 | 3.0 |
| Characteristics of molding | Thickness of molding | mm |  | 3.6 | 3.1 | 2.8 | 4.8 |  | 4.1 | 3.9 | 4.3 |
|  | Specific gravity |  |  | 0.90 | 0.82 | 1.01 | 0.52 |  | 0.89 | 0.82 | 1.01 |
|  | Average cell diameter | μm |  | unmeasurable | unmeasurable | unmeasurable | 195 |  | 362 | 268 | 255 |
|  | Uniformity of cells |  |  | X | X | X | X |  | X | X | X |
|  | Thickness of skin layer | μm |  | 472 | 580 | 597 | 412 |  | 362 | 268 | 255 |
|  | Load resistance improvement factor |  |  | X | X | X | X |  | X | Δ | X |
|  | α |  |  | 1.51 | 1.61 | 1.70 | 1.41 |  | 1.51 | 1.51 | 1.51 |
|  | Absolute value of (α-β) |  |  | 0.62 | 0.65 | 0.82 | 0.50 |  | 0.62 | 0.62 | 0.62 |

TABLE 6

|  |  |  |  | Comparative Example 1-9 | Comparative Example 1-10 | Comparative Example 1-11 | Comparative Example 1-12 | Comparative Example 1-13 | Comparative Example 1-14 | Comparative Example 1-15 | Comparative Example 1-16 |
|---|---|---|---|---|---|---|---|---|---|---|---|
| (A) | a1 | Polyamide 6-1 | parts by mass | 95 | 95 | 80 | 70 | 70 | 70 | 70 | 70 |
|  | a2 | Polyamide 6-2 | parts by mass |  |  |  |  |  |  |  |  |
|  | a3 | Polyamide 66-1 | parts by mass |  |  |  |  |  |  |  |  |
|  | a4 | Polyamide 11 | parts by mass |  |  |  |  |  |  |  |  |
|  | b1 | Polyamide 6T6I | parts by mass |  |  |  |  |  |  |  |  |
|  | b2 | Polyamide PACM14 | parts by mass |  |  |  |  |  |  |  |  |
|  | b3 | Polyamide MACM12-I | parts by mass |  |  |  |  |  |  |  |  |
| (B) | B1 | Styrene polymer 1 | parts by mass |  |  |  |  |  |  |  |  |
|  | B2 | Styrene polymer 2 | parts by mass |  |  |  |  |  |  |  |  |
| (C) | C1 | Glass fiber 1 | parts by mass |  |  |  |  | 30 | 30 | 30 | 30 |
|  | C2 | Glass fiber 2 | parts by mass |  |  |  | 20 |  |  |  |  |
|  | C3 | Layered silicate | parts by mass | 5 | 5 |  |  |  |  |  |  |
|  | C4 | Glass beads | parts by mass |  |  |  |  |  |  |  |  |
| Production conditions | Productivity |  |  | ○ | ○ | ○ | ○ | ○ | ○ | ○ | ○ |
|  | Nitrogen/Carbon dioxide | parts by mass |  | —/0.3 | —/0.8 | 0.3/— | 0.1/— | 0.2/— | 0.3/— | 1.0/— | —/1.0 |
|  | Core retraction | mm |  | 6.0 | 6.0 | 3.0 | 3.0 | 3.0 | 3.0 | 3.0 | 3.0 |
| Characteristics of molding | Thickness of molding | mm |  | 3.2 | 3.9 | 4.0 | 3.4 | 3.6 | 4.1 | 4.2 | 4.0 |
|  | Specific gravity |  |  | 0.86 | 0.80 | 0.72 | 0.93 | 0.90 | 0.85 | 1.05 | 1.11 |
|  | Average cell diameter | μm |  | 392 | 412 | 299 | 289 | unmeasurable | unmeasurable | unmeasurable | unmeasurable |
|  | Uniformity of cells |  |  | X | X | X | X | X | X | X | X |
|  | Thickness of skin layer | μm |  | 282 | 308 | 380 | 425 | 438 | 510 | 679 | 728 |

TABLE 6-continued

|  | Comparative Example 1-9 | Comparative Example 1-10 | Comparative Example 1-11 | Comparative Example 1-12 | Comparative Example 1-13 | Comparative Example 1-14 | Comparative Example 1-15 | Comparative Example 1-16 |
|---|---|---|---|---|---|---|---|---|
| Load resistance improvement factor | X | X | Δ | X | X | X | X | X |
| α | 1.51 | 1.51 | 1.51 | 1.51 | 1.51 | 1.51 | 1.51 | 1.51 |
| Absolute value of (α-β) | 0.62 | 0.62 | 0.62 | 0.62 | 0.62 | 0.62 | 0.62 | 0.62 |

As is apparent from Tables 1 to 6, the expanded polyamide resin moldings of Examples 1-1 to 1-39 are expanded moldings each having a uniform, fine expanded cell structure and being lightweight and superior in load resistance. In contract, the expanded moldings of Comparative Examples 1-1 to 1-16 each were low in specific gravity but tended to have foam cells being uneven and coarse and failed to exhibit stable load resistance. These moldings were all inferior in at least one evaluation criterion compared with Examples 1-1 to 1-39.

Figure 2:
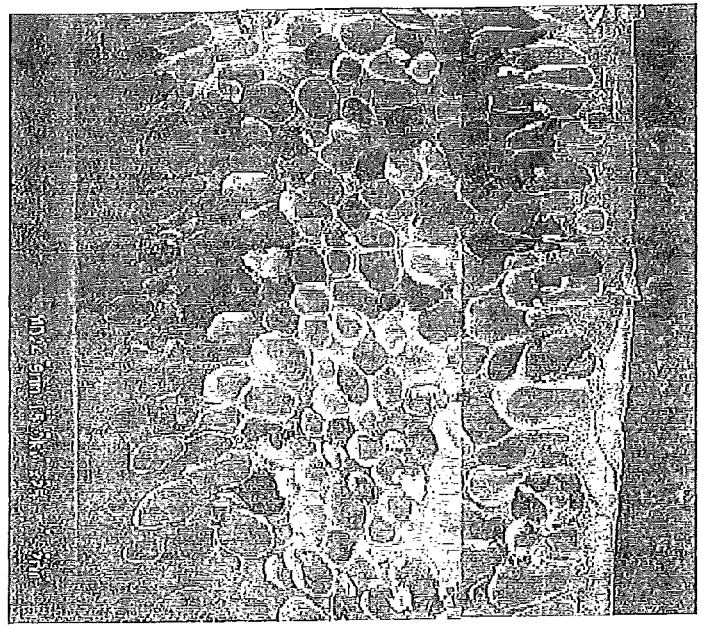
FIG. 2 is a photograph of a cross-section of the expanded polyamide resin molding of Comparative Example 1-9.

The expanded moldings obtained in Example 1-27 and Comparative Example 1-9 were cut and the cross sections thereof were observed with a scanning electron microscope. The cross section photograph of the expanded molding of Example 1-27 is shown in FIG. 1 ((A) is at 25 magnifications and (B) is at 120 magnifications), the cross section photograph (at 25 magnifications) of the expanded molding of Comparative Example 1-9 is shown in FIG. 2. FIG. 1 and FIG. 2 show that the expanded polyamide resin molding of the present invention has a uniform, fine foam cell structure, whereas the expanded molding of Comparative Example 1-9 is uneven in cell size and has cells remarkably greater compared with the expanded polyamide resin molding of the present invention.

Examples 2-1 to 2-20 and Comparative Examples 2-1 to 2-9

The use amounts of the above-described raw materials (A) to (C) were determined as shown in Tables 7 to 9, and regarding the use amounts of other additives in Examples and Comparative Examples, the amount of the stabilizer was set to 0.3 parts by mass, the amount of the release agent was set to 0.3 parts by mass, and the amount of the black pigment was set to 1.0 part by mass. These materials were mixed with a 35φ twin screw extruder (manufactured by Toshiba Machine Co., Ltd.). Specifically, the polyamide resin (A) (the crystalline polyamide resin (a) and the noncrystalline polyamide resin (b)), the glycidyl group-containing styrene copolymer (B), and the other additives (the stabilizer, the release agent, and the black pigment) were charged first simultaneously through a hopper at a screw rotation speed of 100 rpm, followed by melt-kneading, and then the inorganic reinforcing material (C) was charged by side feeding. At this time, the cylinder temperature was set to 280° C. when polyamide 66-1 (a3) was used as the crystalline polyamide resin (a) and set to 250° C. when polyamide 6-1 (a1), polyamide 6-2 (a2), or polyamide 11 (a4) was used. A strand discharged from the extruder was cooled in a water bath, and then was pelletized with a strand cutter, followed by drying at 125° C. for 5 hours, so that a second polyamide resin composition was obtained in the form of pellets.

Next, an expanded molding was prepared by the mold enlargement method described above using the second polyamide resin composition obtained above. There was used, as a mold, a mold for flat panel production (mold B) composed of a stationary mold and a mobile mold capable of forming a cavity being 80 mm in width, 120 mm in length, and 2 mm in thickness when being closed. Specifically, supercritical nitrogen was injected in the amount (parts by mass: relative to 100 parts by mass of the resin ingredients in the polyamide resin composition) provided in the respective tables at a plasticizing region of an electric injection molding machine having a mold clamping force of 1800 kN, a screw diameter of 42 mm, and a screw with L/D of 30. After injecting and filling into the mold B, the surface temperature of which was controlled at 80 to 120° C. (an optimum condition was chosen therebetween), the mobile mold was moved to the mold opening direction by a length provided as the amount (mm) of core retraction in the respective table to enlarge the capacity of the cavity, so that an expanded molding was obtained. At this time, the delay time from the completion of injection to the start of core retraction was set to 0.5 seconds to 1.0 second (an optimum condition was chosen therebetween), the movement speed of the mobile mold (core retraction speed) was set to an arbitrary speed within the range of 2 to 10 mm/second (an optimum condition was chosen therebetween) for core retraction distances of from 0 mm to 0.5 mm, and also to an arbitrary speed within the range of 0.5 to 5 mm/second (an optimum condition was chosen therebetween) for core retraction distances of from 0.5 mm to the amount (mm) of core retraction given in the respective tables.

The evaluation results of the expanded polyamide resin moldings obtained in Examples 2-1 to 2-20 and Comparative Examples 2-1 to 2-9 are shown in Tables 7 to 9. In Comparative Example 2-1 to 2-5, since every specific gravity exceeding 1.1 clearly showed that expansion occurred insufficiently, evaluations of average cell diameter, the uniformity of cells, the thickness of a skin layer, and the load resistance improvement factor were not performed.

TABLE 7

|  |  |  |  | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|---|---|---|
| (A) | a1 | Polyamide 6-1 | parts by mass | 65 | 60 | 55 | 60 | 60 | 64 | 62 | 62 | 85 | 49 |
|  | a2 | Polyamide 6-2 | parts by mass |  |  |  |  |  |  |  |  |  |  |
|  | a3 | Polyamide 66-1 | parts by mass |  |  |  |  |  |  |  |  |  |  |
|  | a4 | Polyamide 11 | parts by mass |  |  |  |  |  |  |  |  |  |  |
|  | b1 | Polyamide 6T6I | parts by mass | 5 | 10 | 15 |  |  | 5 | 5 | 5 | 10 | 5 |
|  | b2 | Polyamide PACM14 | parts by mass |  |  |  | 10 |  |  |  |  |  |  |

TABLE 7-continued

|  |  |  |  | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|---|---|---|
|  | b3 | Polyamide MACM12-I | parts by mass |  |  |  |  | 10 |  |  |  |  |  |
| (B) | B1 | Styrene polymer 1 | parts by mass |  |  |  |  |  | 1 | 3 |  | 5 | 1 |
|  | B2 | Styrene polymer 2 | parts by mass |  |  |  |  |  |  |  | 3 |  |  |
| (C) | C1 | Glass fiber 1 | parts by mass | 30 | 30 | 30 | 30 | 30 | 30 | 30 | 30 |  | 45 |
|  | C2 | Glass fiber 2 | parts by mass |  |  |  |  |  |  |  |  |  |  |
|  | C4 | Glass beads | parts by mass |  |  |  |  |  |  |  |  |  |  |
| Production conditions | Productivity |  |  | ◯ | ◯ | ◯ | ◯ | ◯ | ◯ | ◯ | ◯ | ◯ | ◯ |
|  | Nitrogen |  | parts by mass | 0.2 | 0.2 | 0.2 | 0.2 | 0.2 | 0.2 | 0.2 | 0.2 | 0.2 | 0.2 |
|  | Core retraction |  | mm | 3.0 | 3.0 | 3.0 | 3.0 | 3.0 | 3.0 | 3.0 | 3.0 | 3.0 | 3.0 |
|  | Thickness of molding |  | mm | 4.9 | 4.8 | 4.9 | 5.0 | 5.0 | 4.8 | 4.9 | 5.0 | 5.0 | 4.9 |
| Characteristics of molding | Specific gravity |  |  | 0.54 | 0.53 | 0.54 | 0.53 | 0.54 | 0.54 | 0.54 | 0.53 | 0.54 | 0.59 |
|  | Average cell diameter |  | μm | 111 | 91 | 101 | 96 | 124 | 118 | 90 | 125 | 112 | 121 |
|  | Uniformity of cells |  |  | ◯ | ◯ | ◯ | ◯ | ◯ | ◯ | ◯ | ◯ | ◯ | ◯ |
|  | Thickness of skin layer |  | μm | 343 | 356 | 360 | 353 | 387 | 376 | 361 | 369 | 380 | 377 |
|  | Load resistance improvement factor |  |  | ◯ | ◯ | ◯ | ◯ | ◯ | ◯ | ◯ | ◯ | ◯ | ◯ |
|  | Appearance |  |  | ◯ | ◯ | ◯ | ◯ | ◯ | ◯ | ◯ | ◯ | ◯ | ◯ |
|  | Temperature of the side opposite from heat source |  | °C. | 80 | 79 | 81 | 82 | 80 | 82 | 78 | 81 | 71 | 80 |
|  | Resonant frequency increase factor |  |  | 2.6 | 2.7 | 2.7 | 2.7 | 2.6 | 2.7 | 2.6 | 2.6 | 3.7 | 2.1 |
|  | Resonant frequency |  | Hz | 430 | 444 | 453 | 448 | 438 | 452 | 433 | 428 | 365 | 534 |

TABLE 8

|  |  |  |  | Example 2-11 | Example 2-12 | Example 2-13 | Example 2-14 | Example 2-15 | Example 2-16 | Example 2-17 | Example 2-18 | Example 2-19 | Example 2-20 |
|---|---|---|---|---|---|---|---|---|---|---|---|---|---|
| (A) | a1 | Polyamide 6-1 | parts by mass |  |  |  | 65 |  |  |  |  | 65 | 62 |
|  | a2 | Polyamide 6-2 | parts by mass | 65 | 30 |  |  |  | 70 | 70 | 20 |  |  |
|  | a3 | Polyamide 66-1 | parts by mass |  | 30 |  |  | 45 |  |  | 20 |  |  |
|  | a4 | Polyamide 11 | parts by mass |  |  | 65 |  |  |  |  |  |  |  |
|  | b1 | Polyamide 6T6I | parts by mass | 5 | 10 |  | 5 | 25 |  |  | 12 | 5 | 5 |
|  | b2 | Polyamide PACM14 | parts by mass |  |  |  |  |  | 20 | 20 |  |  |  |
|  | b3 | Polyamide MACM12-I | parts by mass |  |  | 5 |  |  |  |  |  |  |  |
| (B) | B1 | Styrene polymer 1 | parts by mass |  |  |  |  |  |  |  | 3 |  | 3 |
|  | B2 | Styrene polymer 2 | parts by mass |  |  |  |  |  |  |  |  |  |  |
| (C) | C1 | Glass fiber 1 | parts by mass | 30 | 30 | 30 |  | 30 |  |  |  | 30 | 30 |
|  | C2 | Glass fiber 2 | parts by mass |  |  |  | 30 |  | 10 |  | 45 |  |  |
|  | C4 | Glass beads | parts by mass |  |  |  |  |  |  | 10 |  |  |  |
| Production conditions | Productivity |  |  | ◯ | ◯ | ◯ | ◯ | ◯ | ◯ | ◯ | ◯ | ◯ | ◯ |
|  | Nitrogen |  | parts by mass | 0.2 | 0.2 | 0.2 | 0.2 | 0.2 | 0.2 | 0.2 | 0.2 | 0.2 | 0.2 |
|  | Core retraction |  | mm | 3.0 | 3.0 | 3.0 | 3.0 | 3.0 | 3.0 | 3.0 | 3.0 | 2.0 | 5.0 |
|  | Thickness of molding |  | mm | 5.0 | 4.9 | 4.9 | 5.0 | 4.9 | 4.9 | 4.8 | 5.0 | 3.9 | 6.9 |
| Characteristics of molding | Specific gravity |  |  | 0.52 | 0.53 | 0.54 | 0.52 | 0.53 | 0.48 | 0.49 | 0.59 | 0.58 | 0.45 |
|  | Average cell diameter |  | μm | 102 | 98 | 113 | 96 | 123 | 89 | 95 | 105 | 93 | 111 |
|  | Uniformity of cells |  |  | ◯ | ◯ | ◯ | ◯ | ◯ | ◯ | ◯ | ◯ | ◯ | ◯ |
|  | Thickness of skin layer |  | μm | 376 | 371 | 342 | 351 | 342 | 386 | 344 | 362 | 379 | 371 |
|  | Load resistance improvement factor |  |  | ◯ | ◯ | ◯ | ◯ | ◯ | ◯ | ◯ | ◯ | ◯ | ◯ |
|  | Appearance |  |  | ◯ | ◯ | ◯ | ◯ | ◯ | ◯ | ◯ | ◯ | ◯ | ◯ |
|  | Temperature of the side opposite from heat source |  | °C. | 83 | 81 | 86 | 90 | 86 | 78 | 75 | 93 | 96 | 74 |
|  | Resonant frequency increase factor |  |  | 2.6 | 2.5 | 2.5 | 2.8 | 2.6 | 2.8 | 2.6 | 2.3 | 2.7 | 2.6 |
|  | Resonant frequency |  | Hz | 424 | 417 | 422 | 465 | 432 | 365 | 287 | 563 | 444 | 435 |

TABLE 9

|   |   |   |   | Comparative Example 2-1 | Comparative Example 2-2 | Comparative Example 2-3 | Comparative Example 2-4 | Comparative Example 2-5 | Comparative Example 2-6 | Comparative Example 2-7 | Comparative Example 2-8 | Comparative Example 2-9 |
|---|---|---|---|---|---|---|---|---|---|---|---|---|
| (A) | a1 | Polyamide 6-1 | parts by mass | 100 | 70 | | | | 70 | 70 | | |
| | a2 | Polyamide 6-2 | parts by mass | | | 35 | | | | | | |
| | a3 | Polyamide 66-1 | parts by mass | | | | 50 | 50 | | | | 70 |
| | a4 | Polyamide 11 | parts by mass | | | | | | | | 70 | |
| | b1 | Polyamide 6T6I | parts by mass | | | 10 | | | | | | |
| | b2 | Polyamide PACM14 | parts by mass | | | | | | | | | |
| | b3 | Polyamide MACM12-1 | parts by mass | | | | | | | | | |
| (B) | B1 | Styrene polymer 1 | parts by mass | | | | | | | | | |
| | B2 | Styrene polymer 2 | parts by mass | | | | | | | | | |
| (C) | C1 | Glass fiber 1 | parts by mass | | 30 | 55 | 50 | 50 | 30 | | | 30 |
| | C2 | Glass fiber 2 | parts by mass | | | | | | | 30 | | |
| | C4 | Glass beads | parts by mass | | | | | | | | 30 | |
| Production conditions | Productivity | | | ○ | ○ | ○ | ○ | ○ | ○ | ○ | ○ | ○ |
| | Nitrogen | | parts by mass | none | none | none | none | none | 0.2 | 0.2 | 0.2 | 0.2 |
| | Core retraction | | mm | 0.0 | 0.0 | 0.0 | 0.0 | 0.0 | 3.0 | 3.0 | 3.0 | 2.0 |
| | Thickness of molding | | mm | 2.0 | 2.0 | 2.0 | 2.0 | 5.0 | 3.9 | 4.1 | 4.5 | 3.4 |
| Characteristics of molding | Specific gravity | | | 1.14 | 1.36 | 1.64 | 1.57 | 1.57 | 0.91 | 0.76 | 0.54 | 1.10 |
| | Average cell diameter | | μm | — | — | — | — | — | unmeasurable | unmeasurable | unmeasurable | unmeasurable |
| | Uniformity of cells | | | — | — | — | — | — | X | X | X | X |
| | Thickness of skin layer | | μm | — | — | — | — | — | 455 | 438 | 478 | 498 |
| | Load resistance improvement factor | | | — | — | — | — | — | X | X | Δ | Δ |
| | Appearance | | | ○ | ○ | ○ | ○ | ○ | X | X | X | X |
| | Temperature of the side opposite from heat source | | °C. | 150 | 149 | 148 | 150 | 148 | 120 | 125 | 106 | 139 |
| | Resonant frequency increase factor | | | — | — | — | — | — | 1.3 | 2.6 | 1.4 | 1.2 |
| | Resonant frequency | | Hz | 111 | 166 | 254 | 243 | 218 | 213 | 433 | 197 | 182 |

As is apparent from Tables 7 to 9, the expanded polyamide resin moldings of Examples 2-1 to 2-20 are expanded moldings each having a uniform, fine foam cell structure and being lightweight and superior in not only load resistance but also heat insulating characteristics and oscillation characteristics. In contract, the expanded moldings of Comparative Examples 2-1 to 2-9 each were high in specific gravity, tended to have foam cells being uneven and coarse, failed to exhibit stable load resistance, and apparently have almost no heat insulation effect due to their low resonant frequency. These moldings were all inferior in at least one evaluation criterion compared with Examples 2-1 to 2-20.

Figure 6:
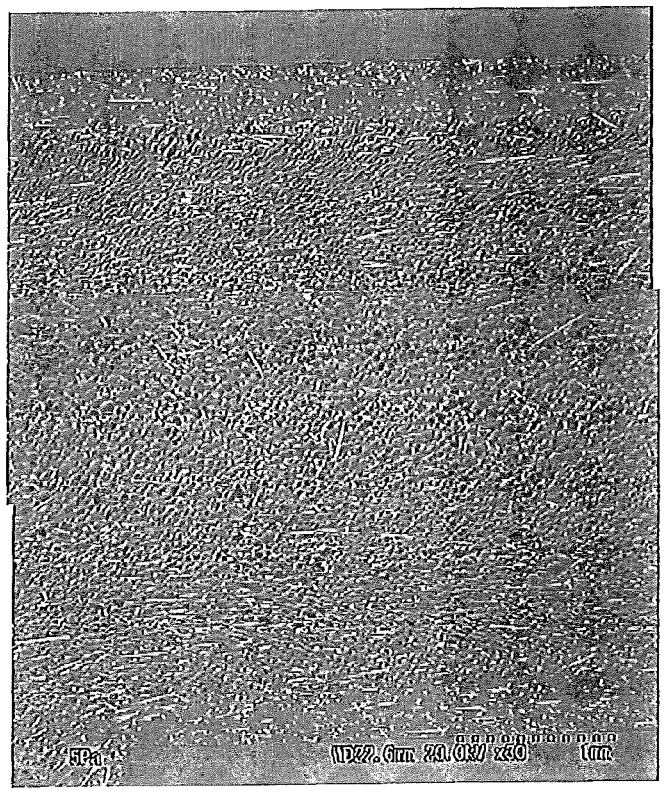
FIG. 6 is a photograph of a cross-section of an expanded polyamide resin molding that is one embodiment of the present invention (Example 2-19).
Figure 6:
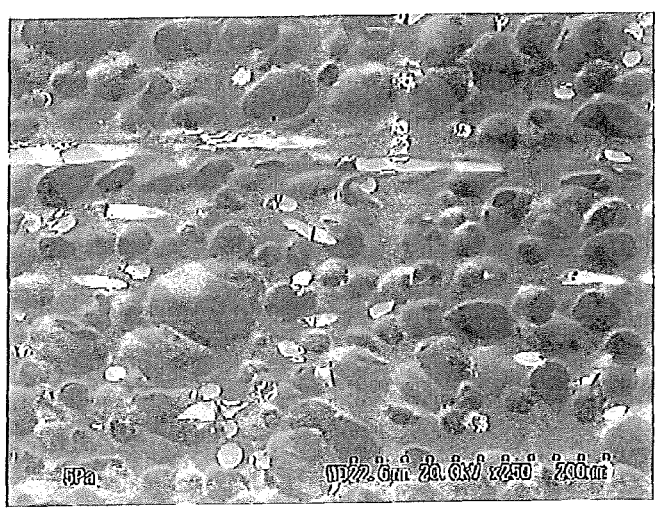
Figure 7:
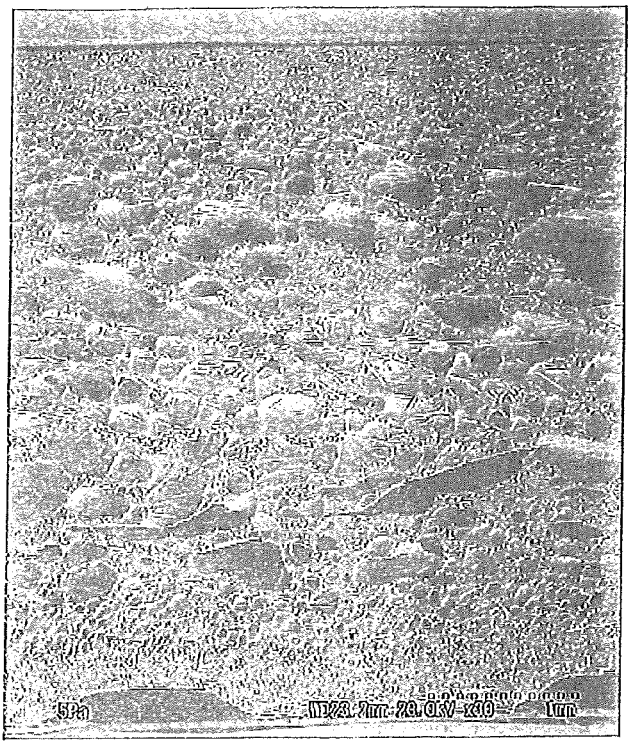
FIG. 7 is a photograph of a cross-section of the expanded polyamide resin molding of Comparative Example 2-6.
Figure 7:

The expanded moldings obtained in Example 2-19 and Comparative Example 2-6 were cut and the cross sections thereof were observed with a scanning electron microscope. The cross section photograph of the expanded molding of Example 19 is shown in FIG. 6 ((A) is at 30 magnifications and (B) is at 250 magnifications), the cross section photograph (at 30 magnifications) of the expanded molding of Comparative Example 2-6 is shown in FIG. 7. FIG. 6 and FIG. 7 show that the expanded polyamide resin molding of the present invention has a uniform, fine foam cell structure, whereas the expanded molding of Comparative Example 2-6 is uneven in cell size and has cells remarkably greater compared with the expanded polyamide resin molding of the present invention.

DESCRIPTION OF REFERENCE SIGNS

1 a stationary mold
2 a mobile mold
3 a cavity
4 a injection molding machine
5 a gas cylinder
6 a pressure booster pump
7 a pressure control valve
10 a specimen
11 an exciter
20 an expanded molding
21 a heat source (hot plate)
22 a temperature sensor

The invention claimed is:

1. An expanded polyamide resin molding obtained by using a polyamide resin composition comprising:
   a polyamide resin (A);
   a glycidyl group-containing styrene copolymer (B) having two or more glycidyl groups per molecule, a weight average molecular weight of 4000 to 25000, and an epoxy value of 400 to 2500 Eq/1×10$^6$ g; and
   an inorganic reinforcing material (C) in a proportion such that the content of the glycidyl group-containing styrene copolymer (B) is 0.2 to 25 parts by mass and the content of the inorganic reinforcing material (C) is 0 to 350 parts by mass relative to 100 parts by mass of the polyamide resin (A),
   wherein the expanded polyamide resin molding comprises an expanded layer comprising a continuous resin phase and closed foam cells, and an unexpanded skin layer on the expanded layer, and
   wherein the expanded layer has an average cell diameter of 300 μm or shorter and has no voids having a length continuity of 800 μm or longer.

2. The expanded polyamide resin molding according to claim 1, wherein the polyamide resin (A) comprises a crystalline polyamide resin (a) and a noncrystalline polyamide resin (b), the proportion of which is (a):(b)=0 to 100:100 to 0 (mass ratio).

3. The expanded polyamide resin molding according to claim 1, wherein the glycidyl group-containing styrene copolymer (B) is a copolymer including 20 to 99% by mass of a vinyl aromatic monomer (X), 1 to 80% by mass of a glycidylalkyl (meth)acrylate (Y), and 0 to 79% by mass of a vinyl group-containing monomer (Z) containing no epoxy group other than the (X).

4. The expanded polyamide resin molding according to claim 1, wherein a matrix composition comprising the polyamide resin (A) and the glycidyl group-containing styrene copolymer (B) has an $\alpha$ of smaller than 1.4 and an absolute value of $(\alpha-\beta)$ of 0.5 or less, where a multiplier ($y=ax^{\alpha}$; a is a constant) taken when a storage modulus (unit: Pa) obtained by melt viscoelasticity measurement within a frequency range of 10 to 100 rad/s in a linear region is plotted on a log-log graph of a frequency (x) and a storage modulus (y) is represented by $\alpha$, and a multiplier ($y'=bx'^{\beta}$; b is a constant) taken when a loss modulus (unit: Pa) obtained by melt viscoelasticity measurement within a frequency range of 10 to 100 rad/s in a linear region is plotted on a log-log graph of a frequency (x') and a loss modulus (y') is represented by $\beta$.

5. The expanded polyamide resin molding according to claim 1 obtained by injecting and filling the polyamide resin composition in a molten state together with a supercritical inert gas into a cavity formed by two or more molds closed, and then enlarging the capacity of the cavity by moving at least one of the molds in the mold opening direction at a stage where an unexpanded skin layer being 100 to 800 μm in thickness is formed in a surface layer.

6. An expanded polyamide resin molding obtained by bringing a polyamide resin composition into a molten state, injecting and filling the polyamide resin composition together with a supercritical inert gas into a cavity formed by two or more molds closed, and then enlarging the capacity of the cavity by moving at least one of the molds in the mold opening direction at a stage where an unexpanded skin layer being 100 to 800 μm in thickness is formed in a surface layer, wherein
the polyamide resin composition comprises:
a crystalline polyamide resin (a);
a noncrystalline polyamide resin (b);
a glycidyl group-containing styrene copolymer (B) having two or more glycidyl groups per molecule, a weight average molecular weight of 4000 to 25000, and an epoxy value of 400 to 2500 Eq/1×10⁶ g; and
an inorganic reinforcing material (C) in a proportion such that the content of the glycidyl group-containing styrene copolymer (B) is 0 to 30 parts by mass and the content of the inorganic reinforcing material (C) is 0 to 350 parts by mass relative to 100 parts by mass of the crystalline polyamide resin (a) and the noncrystalline polyamide resin (b) in total,
the expanded polyamide resin molding comprises an expanded layer comprising a continuous resin phase and closed foam cells and an unexpanded skin layer on the expanded layer, and
the expanded layer has the average cell diameter of 300 μm or shorter and has no voids having a length continuity of 800 μm or longer.

7. The expanded polyamide resin molding according to claim 6, wherein the proportion of the crystalline polyamide resin (a) and the noncrystalline polyamide resin (b) is the crystalline polyamide-resin (a): the noncrystalline polyamide resin (b)=95:5 to 50:50 (mass ratio).

8. The expanded polyamide resin molding according to claim 6, wherein the glycidyl group-containing styrene copolymer (B) is a copolymer including 20 to 99% by mass of a vinyl aromatic monomer (X), 1 to 80% by mass of a glycidylalkyl (meth)acrylate (Y), and 0 to 79% by mass of a vinyl group-containing monomer (Z) containing no epoxy group other than the (X).

9. The expanded polyamide resin molding according to claim 6, wherein the resonant frequency, x (Hz), of the expanded polyamide resin molding is 1.5 times or more the resonant frequency, y(Hz), of an unexpanded molding obtained by bringing the polyamide resin composition into a molten state, injecting the polyamide resin composition into a cavity formed by two or more molds closed without pouring any supercritical inert gas, and molding the polyamide resin composition without moving any mold in the mold opening direction.

10. The expanded polyamide resin molding according to claim 6, wherein the expanded layer composed of the continuous resin phase and closed foam cells having an average cell diameter of 10 to 300 μm and the unexpanded skin layer stacked on the expanded layer and having a thickness of 100 to 800 μm are formed of the polyamide resin composition, and the expanded polyamide resin molding has a specific gravity of 0.2 to 1.0.

11. The expanded polyamide resin molding according to claim 10, having a sandwich structure in which the unexpanded layers are provided on both sides of the expanded layer.

12. An automotive resin molding having a heat insulating property, which is formed of the expanded polyamide resin molding according to claim 6.

13. The automotive resin molding having a heat insulating property according to claim 12, which is a thermally resistant cover selected from the group consisting of an engine cover, a cylinder head cover, and a transmission cover.

14. The expanded polyamide resin molding according to claim 1, wherein the expanded layer comprising the continuous resin phase and closed foam cells having an average cell diameter of 10 to 300 μm and the unexpanded skin layer stacked on the expanded layer and having a thickness of 100 to 800 μm are formed of the polyamide resin composition, and the expanded polyamide resin molding has a specific gravity of 0.2 to 1.0.

15. The expanded polyamide resin molding according to claim 14, having a sandwich structure in which the unexpanded layers are provided on both sides of the expanded layer.

* * * * *